(12) United States Patent
Watanabe et al.

(10) Patent No.: US 7,420,892 B2
(45) Date of Patent: Sep. 2, 2008

(54) OPTICAL HEAD DEVICE, AND OPTICAL RECORDING/REPRODUCING DEVICE

(75) Inventors: Tetsu Watanabe, Tokyo (JP); Takakiyo Kanazawa, Kanagawa (JP); Kenji Yamamoto, Kanagawa (JP); Masahiro Yamada, Kanagawa (JP); Tadashi Taniguchi, Kanagawa (JP)

(73) Assignee: Sony Corporation (JP)

( * ) Notice: Subject to any disclaimer, the term of this patent is extended or adjusted under 35 U.S.C. 154(b) by 463 days.

(21) Appl. No.: 10/501,159

(22) PCT Filed: Feb. 19, 2003

(86) PCT No.: PCT/JP03/01770
§ 371 (c)(1), (2), (4) Date: Jul. 13, 2004

(87) PCT Pub. No.: WO03/071526
PCT Pub. Date: Aug. 28, 2003

(65) Prior Publication Data
US 2005/0083791 A1      Apr. 21, 2005

(30) Foreign Application Priority Data
Feb. 19, 2002   (JP) ............................. 2002-041714

(51) Int. Cl.
*G11B 7/00* (2006.01)
(52) U.S. Cl. ................. 369/44.22; 369/44.14
(58) Field of Classification Search .............. None
See application file for complete search history.

(56) References Cited
U.S. PATENT DOCUMENTS 4,667,315 A * 5/1987 Fujii et al. ............... 369/44.35
4,703,408 A * 10/1987 Yonezawa et al. ......... 369/44.13
5,982,733 A * 11/1999 Yanagawa et al. ....... 369/112.16
6,243,216 B1 * 6/2001 Yoo et al. .................... 359/793
6,449,221 B1 * 9/2002 Knight et al. ............. 369/13.35

FOREIGN PATENT DOCUMENTS

JP        61-273755       12/1986

(Continued)

OTHER PUBLICATIONS

Japanese Patent Application 2002-041714, Office Action issued on Jul. 4, 2006.

*Primary Examiner*—Joseph Feild
*Assistant Examiner*—Tawfik Goma
(74) *Attorney, Agent, or Firm*—Rader Fishman & Grauer PLLC; Ronald P. Kananen

(57) ABSTRACT

A compact and light flying head type magneto-optical head apparatus is provided. The magneto-optical head apparatus (1) of the present invention comprises a suspension (12) whose one end is fixed to a lower surface of an arm (11), a slider (13) fixed to a free end of the suspension (12), and a magnetic modulation coil (14) and an object lens (15) mounted on the slider (13). The slider (13) mounted with the magnetic modulation coil (14) and the object lens (15) floats due to a wind pressure caused by rotation of an MO disk (3). The magneto-optical head apparatus (1) is further provided with a collimeter lens (21) between a light source (71) and the object lens (15) in a hybrid optical apparatus (7) provided to the arm (11), and a position of the collimeter lens (21) can be adjusted vertically along an optical axis O-O by a collimeter actuator (23), so that optical conditions between the light source (71) and the object lens (15) are improved.

22 Claims, 22 Drawing Sheets

FOREIGN PATENT DOCUMENTS

| | | |
|---|---|---|
| JP | 07-057284 | 3/1995 |
| JP | 07-065383 | 3/1995 |
| JP | 2000-20980 A | 1/2000 |
| JP | 2001-052367 | 2/2001 |
| JP | 2001-155374 A | 6/2001 |
| JP | 2001-297457 | 10/2001 |
| JP | 2002-56564 A | 2/2002 |

* cited by examiner

OPTICAL HEAD DEVICE, AND OPTICAL RECORDING/REPRODUCING DEVICE

TECHNICAL FIELD

The present invention relates to an optical disk recording/reproducing apparatus, magneto-optical disk recording/reproducing apparatus and other optical recording/reproducing apparatus and an optical head apparatus used in an optical recording/reproducing apparatus, and particularly relates to a flying head type optical head apparatus and an optical recording/reproducing apparatus using the same.

Specifically, the present invention relates to a flying head type optical head apparatus for performing focus control and/or tracking control by moving a collimator lens and an optical recording/reproducing apparatus using the same.

BACKGROUND ART

A flying head type optical disk head wherein an optical head apparatus is divided to a fixed portion and a movable portion and the movable portion floats by a predetermined distance from an optical rotary recording medium, such as a magneto-optical disk, has been in practical use.

As a first related art of a flying head type magneto-optical head, FIG. 19 is a view which illustrates a "flying head type magneto-optical head" 22 wherein a wind pressure caused by rotation of a magneto-optical disk 210 is utilized to float a head portion in the focusing direction.

The magneto-optical head 220 comprises an optical block 221, a single actuator 222, a voice coil motor 223, a Galvano mirror 224 and an over light magnetic head 225 mounted on the single actuator 222, for performing data writing to a magneto-optical disk 210, such as an MD, rotated by a spindle motor 215 and data reading from the magneto-optical disk 210.

The optical block 221 comprises a laser diode, a beam spritter and a photo detector, etc. integrally as one body. Note that an object lens is provided at an end portion of the head near the over-light magnetic head 225 and separated from the optical block 221.

The voice coil motor 223 moves the single actuator 222 in one direction.

The voice coil motor 223 and the Galvano mirror 224 perform tracking control of the magneto-optical head 220.

A focus control is performed by the single actuator 222.

As a result that the over light magnetic head 225 floats from the surface of the magneto-optical disk 210 by leaving an exactly predetermined space due to a wind pressure caused by rotation of the magneto-optical disk 210, a focus distance is maintained.

A beam light emitted from a laser diode in the optical block 221 passes through the beam spritter, deflected by the Galvano mirror 224 and guided to the object lens positioned at the end of the head.

The object lens converges the beam light to make it expose a recording surface of the magneto-optical disk 210.

A reflection light from the magneto-optical disk 210 passes the object lens in the direction toward the Galvano mirror 224, and a return-back light deflected by the Galvano mirror 224 enters the beam spritter, deflected by the beam spritter and enters the photo detector. The photo detector is, for example, a four divided detector.

In the magneto-optical head 220, an optical system of the optical block 221 and the object lens are optically connected via the Galvano mirror 224.

As explained above, since only the object lens including the single actuator, a 45-degree mirror and the flying head are the movable portion, there is an advantage that the moving portion becomes compact.

However, the configuration of the magneto-optical head 220 for driving the single actuator 222 by the voice coil motor 223 is complicated and dimensions of the magneto-optical head 220 are large. Furthermore, since an optical path from the optical block 221 to the object lens is too long, optical reliability is low and it is hard to be more compact and lower in costs.

To attain a still larger capacity, a "multi-plate" optical recording/reproducing apparatus wherein a plurality of magneto-optical disks 210 having the complicated configuration as above are stacked along one rotation axis has been attempted, but it is virtually difficult to apply the above magneto-optical pickup to such an apparatus.

FIG. 20 is a view of the configuration of a magneto-optical head apparatus as a second related art of a flying head type magneto-optical head.

The magneto-optical head apparatus 320 is a flying head type magneto-optical head apparatus proposed by the TeraStor Corporation. The magneto-optical head apparatus performs data writing and data reading to and from a magneto-optical disk 310, such as an MD, rotated by a spindle motor (not shown). Therefore, the magneto-optical head apparatus 320 comprises a swing arm 321, a flying head type magneto-optical head 322 attached to one end portion of the arm 321, an object lens 327 mounted on the magneto-optical head 322, a magnetic modulation coil (not shown), a first mirror 323 provided at an upper portion of the magneto-optical head 322, a second mirror 324 provided on the arm 321, a voice coil motor 325 for performing tracking control by moving the arm 321 to rotate in the horizontal direction, and a light source module 326.

The light source module 326 comprises a laser diode, a beam splitter and a photo detector, etc. The photo detector is, for example, a four divided detector.

The object lens 327 is mounted on the magneto-optical head 322 and separated from the light source module 326.

The second mirror 324 and the first mirror 323 introduce a light beam from the laser diode in the light source module 326 to the object lens 327 mounted on the magneto-optical head 322. Namely, the beam light emitted from the laser diode in the light source module 326 passes the beam spritter and deflected to the first mirror 323 by the second mirror 324. The first mirror 323 deflects the incident light to the object lens 327. The object lens 327 converges the incident light to make it expose a recording surface of the magneto-optical disk 310.

The reflected light from the magneto-optical disk 310 passes through the object lens 327 mounted on the magneto-optical head 322, passes through the second mirror 324 from the first mirror 323, enters the beam spritter in the light source module 326 and reaches the photo detector.

The tracking control by the magneto-optical head 322 is preformed by swinging the arm 321 (a surface in parallel with the magneto-optical disk surface) in a range of a predetermined angle in the horizontal direction by driving the voice coil motor 325. The magneto-optical head 322 floats from the surface of the magneto-optical disk 310 by exactly a necessary distance for accessing due to a wind pressure caused by rotation of the magneto-optical disk 310. Accordingly, focus control is unnecessary.

Since the first mirror 323 or the second mirror 324 is driven by a micro actuator, there is an advantage that two-step tracking control, that is a coarse motion and a fine motion, becomes easy with the swing arm 321. However, the second prior art has problems listed below.

(1) In the magneto-optical head 320, since the arm 321 and the light source module 326 move integrally at the time of a near field recording operation, there are disadvantages that an inertia mass becomes large when moving the arm 321 and a seek time becomes long. Moreover, the voice coil motor 325 for outputting a considerably strong power is to be used. As a result, dimensions of the apparatus become large, it is hard to attain low cost, and there are limits for downsizing.

(2) In addition to the object lens 327 and the magnetic modulation coil, the first mirror 323 is mounted on the magneto-optical head 322 which floats in response to rotation of the magneto-optical disk 310, so that weight of the magneto-optical head 322 becomes large and a sufficient float value cannot be obtained in some cases.

(3) In the magneto-optical head 320, since a light path between the first mirror 323 and the second mirror 324 is open, there is a possibility that a disturbance light enters and reliability of a light propagation in the light path is not guaranteed. A method of using a polarized wave plane maintain type optical fiber instead of the first mirror 323 and the second mirror 324 is possible, but a decline of signal quality becomes a problem in that case.

Since the magneto-optical head 320 has large apparatus size, it is not suitable to a "multi-layered" multi plated magneto-optical recording/reproducing apparatus obtained by stacking a plurality of magneto-optical disks along one rotation axis.

FIG. 21 is a view of the configuration of a magneto-optical head apparatus as a third related art of a flying head type magneto-optical head.

The magneto-optical head apparatus 420 is a flying head type magneto-optical head apparatus proposed by the QUINTA Corporation.

The magneto-optical head apparatus 420 comprises an arm 421, gimbals 422 formed by an elastic member having flexibility fixed at an end of the arm 421, a slider 423 floating by a predetermined distance from a magneto-optical disk 410 fixed at an end of the gimbals 422, an object lens 424 mounted on the slider 423, an electro-static mirror 425, an optical system 426 provided between the electro-static mirror 425 and the object lens 424, an optical block 427 and an optical fiber 428 provided between the optical block 427 and the electro-static mirror 425.

The optical block 427 comprises a laser diode, a beam spritter and a photo detector, etc.

The photo detector is, for example, a four divided detector.

A beam light emitted from the laser diode in the optical block 427 passes through the beam spritter, enters the optical fiber 428, propagates in the optical fiber 428 to irradiate the electro-static mirror 425 to be deflected by the electro-static mirror 425, passes through the optical system 426, enters the object lens 424 to be converged by the object lens 424 and expose the recording surface of the magneto-optical disk 410.

A reflected light from the magneto-optical disk 410 passes an opposite light path from the above to enter the beam spritter in the optical block 427 to be deflected by the beam spritter and irradiate the photo detector.

In tracking control by the magneto-optical head 420, the arm 421 moves in a range of a predetermined angle on a surface in parallel with the magneto-optical disk surface (in the perpendicular direction with respect to the paper surface) by an actuator, such as a not shown voice coil motor, to be positioned at a predetermined track of the magneto-optical disk 410 by also using the electro-static mirror 425.

Since the slider 423 floats by a predetermined distance from the magneto-optical disk 410 due to a wind pressure caused by rotation of the magneto-optical disk 410, the object lens 424 is away from the magneto-optical disk 410 by exactly a predetermined distance. Accordingly, focus control is unnecessary.

However, the magneto-optical head 420 illustrated in FIG. 21 uses the optical fiber 428, so that there is a problem that the optical fiber 428 becomes a load on the rotating motion of the arm 421 to decline rotatable motion characteristics of the arm 421. Furthermore, since the optical fiber 428 and the electro-static mirror 425 perform optical coupling, there is a disadvantage that an optical coupling efficiency (coupling efficiency) becomes poor.

Moreover, in the magneto-optical head 420, a push-pull signal cannot be obtained, so that a sample servo has to be used for tracking control.

In an optical recording/reproducing apparatus, shortening of a wave length and increasing of a numerical aperture (NA) have been developed. For example, the NA was conventionally 0.5 or so, but recently, there are those having the NA of 0.9 in the far field range (FFR) and the NA of 1.4 or so in the near field range. A focus margin in such a state has to be, for example, ±0.158 in the FFR and ±10 nm to ±20 nm or so in the NFR, which is smaller than a conventional margin of ±1 µm. However, a focus margin as such can be secured in principle when applying the flying head type magneto-optical head configuration.

In actually, however, it is hard to attach an object lens to the flying head type magneto-optical head while securing accuracy of ±10 nm to ±20 nm or so in the NFR, and a problem of attachment accuracy arises. Furthermore, a position of attaching the object lens may shift due to temperature changes and humidity changes. Shift of a position as such is also hard to be prevented by adhesion.

As a method of overcoming problems as above, for example, as proposed in the Japanese Unexamined Patent Publication No. 7-65383, there is known a method of eliminating a DC focus amount by applying the configuration provided with an object lens attached with an electromagnetic actuator and adjusting the position mainly by the electromagnetic actuator. However, the flying head proposed by the Japanese Unexamined Patent Publication No. 7-65383 has a problem that dimensions of the flying head become large. When dimensions of the flying head become large, preferable flying (floating) characteristics cannot be attained and the price becomes high, as well.

As another method, for example, as proposed in the Japanese Unexamined Patent Publication No. 7-57284, there is known a method of eliminating a DC focus amount by providing a relay lens using two collimator lenses as illustrated in FIG. 22 to an optical fixed portion and adjusting a distance between the two lenses.

However, the flying head proposed in the Japanese Unexamined Patent Publication No. 7-57284 also has a problem that the dimensions become large because the distance is adjusted by using the two collimator lenses. Particularly, it is significant for the flying head type optical head apparatus used in near field recording to have very small dimensions. When the dimensions of the flying head become large, preferable flying (floating) characteristics cannot be attained. Furthermore, there is a problem that a price of the optical head apparatus becomes high.

There have been demands for a compact optical head and an optical recording/reproducing apparatus using the optical head which can be applied to a recent downsized magneto-optical recording medium and near field recording.

An increase of a recording capacity is furthermore demanded. As one method thereof, a "multilayered (multi plated)" magneto-optical recording/reproducing apparatus obtained by stacking a plurality of magneto-optical disks, etc. along one rotation axis has been desired, and a magneto-optical head, a magneto-optical pickup and other optical heads suitable to such a multi plated magneto-optical recording/reproducing apparatus have been demanded.

The flying head proposed in the Japanese Unexamined Patent Publication No. 7-57284, however, hardly realizes a so called "multilayered (or multi-plated)" optical recording/reproducing apparatus attempting downsizing and increasing of a memory capacity by stacking a plurality of magneto-optical disks along a rotation axis of a motor for rotating a magneto-optical disk.

In the flying head, it is known that a float value of a slider fluctuates, and it is preferable to correct the fluctuation of the float value as such to attain more accurate focus control. Since such fluctuation of the float amount has a high frequency, it is considered to be AC components.

A magneto-optical head or a magneto-optical pickup used in a magneto-optical disk has been explained as prior arts above, but an optical pickup, etc. for performing signal reading only by an optical signal also encounter similar problems as above.

DISCLOSURE OF THE INVENTION

An object of the present invention is to provide a flying head type magneto-optical head capable of improving optical characteristics, having high reliability, and capable of performing focus control and/or tracking control with high accuracy at a high speed.

Another object of the present invention is to provide a compact and light flying head type magneto-optical head in addition to the above.

Still another object of the present invention is to provide a compact optical head for attaining the above objects and is also suitably used for far field recording or near field recording, etc.

Still another object of the present invention is to provide an optical head apparatus suitable to a multi-plated optical recording/reproducing apparatus.

Still another object of the present invention is to provide an optical recording/reproducing apparatus using the above optical head apparatus.

According to a first aspect of the present invention, there is provided a flying head type optical head apparatus, comprising a fixed arm; a suspension, an end of which is fixed to the fixed arm and the other end is a free end; a slider attached to the free end of the suspension; an object lens mounted on the slider; an optical means fixed to the fixed arm and having a light source and a light receiving system; a collimator lens positioned between the light source and the object lens along an optical axis connecting the light source and the object lens, for converging a light from the light source to make it enter the object lens, converging a returned-back light from the object lens to make it enter the light source; and a first collimator lens moving means for moving the collimator lens along the optical axis between the light source and the object lens; wherein the slider mounted with the object lens, attached to the free end of the suspension floats due to a wind pressure of a rotary body rotating at a position facing to the object lens.

Also, according to a second aspect of the present invention, an optical head apparatus of the present invention further comprises a second collimator lens moving means for substantially moving the collimator lens in the direction perpendicular to the optical axis.

Also, in an optical head apparatus of a third aspect of the present invention, the optical means fixed to the fixed arm emits a light from the light source along a surface of the arm; and the fixed arm is provided with a mirror for directing the light emitted from the optical means to the collimator lens.

Furthermore, in an optical head apparatus of a fourth aspect of the present invention, the optical means fixed to the fixed arm emits a light from the light source along a surface of the fixed arm; and the fixed arm has a mirror for directing the light emitted from the optical means to the collimator lens and a mirror rotation means for rotating the mirror for making the light emitted from the optical means enter the collimator lens by being shifted from the optical axis.

In an optical head apparatus of the present invention, the object lens is configured by combining two converging lenses provided close to the slider and may be used for a near field recording operation.

According to a fifth aspect of the present invention, there is provided an optical recording/reproducing apparatus, comprising a rotary driving means for a rotary recording medium for optically or magneto-optically recording and/or recording/reading data; the above optical head apparatus; and a control apparatus for performing tracking control on the optical head apparatus, comprising a collimator lens position control means for controlling a position of the collimator lens by driving the first collimator lens moving means based on a focus error signal.

According to a sixth aspect of the present invention, the optical head apparatus further comprises a second collimator lens moving means for substantially moving the collimator lens in the direction perpendicular to the optical axis; and the control apparatus further comprises a tracking sub servo control means for controlling a position of the collimator lens to the track direction of the rotary recording medium by driving the second collimator lens moving means based on a tracking error signal.

According to a seventh aspect of the present invention, when assuming that the rotary recording medium has one or a plurality of recording surfaces, the collimator lens position control means of the control means drives the first collimator lens moving means to adjust a position of the collimator lens so that a light from the light source is focused on one recording surface subjected to recording or reproducing of data through the object lens among one or a plurality of recording surfaces of the rotary recording medium.

BRIEF DESCRIPTION OF DRAWINGS

The above explained features and objects of the present invention become clearer by explanations below with reference to attached drawings.

BEST MODE FOR CARRYING OUT THE INVENTION

Preferred embodiments of an optical head apparatus of the present invention and an optical recording/reproducing apparatus using the optical head apparatus will be explained.

Below, a magneto-optical head will be explained as an example embodiment of an optical head apparatus of the present invention. Note that an optical type head in the present specification is a term with wide meanings including a magneto-optical head and an optical head, etc.

In the same way, below, a magneto-optical recording/reproducing apparatus will be explained as an embodiment of an optical recording/reproducing apparatus of the present invention, but an optical recording/reproducing apparatus of the present invention includes a magneto-optical recording/reproducing apparatus and an optical recording/reproducing apparatus, etc.

In the present specification, an optical recording/reproducing apparatus is used by widely meaning any one of an optical recording apparatus, an optical reproducing apparatus, and an optical recording and reproducing apparatus.

FIRST EMBODIMENT

With reference to FIG. 1 to FIG. 5, a first embodiment of an optical head apparatus of the present invention and an optical recording/reproducing apparatus using the same will be explained.

Figure 1A:
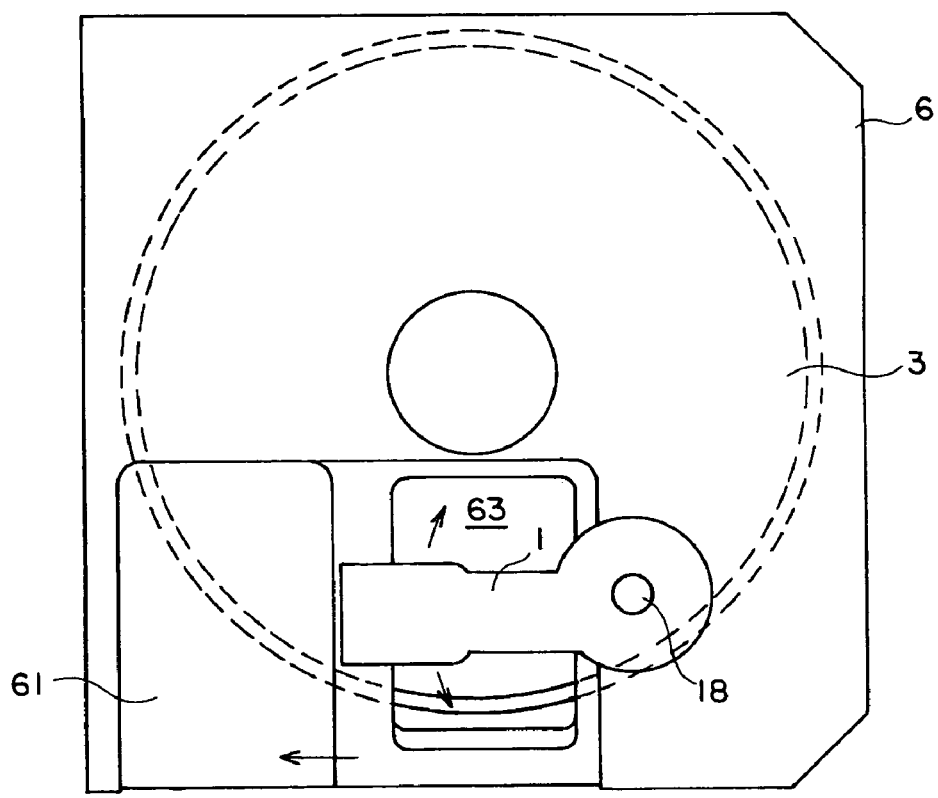
FIG. 1A and FIG. 1B are a plan view and a sectional view of the configuration of a magneto-optical head apparatus as a first embodiment of an optical head apparatus of the present invention.
Figure 1B:
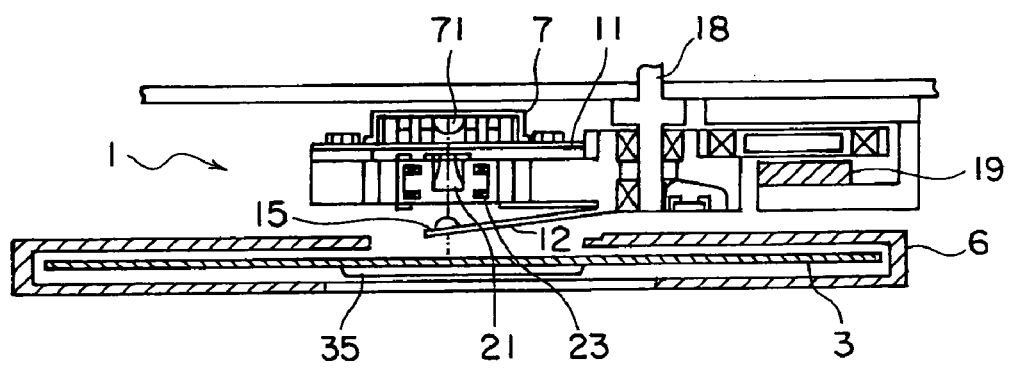

FIG. 1A and FIG. 1B are a plan view and a sectional view of the configuration of a magneto-optical head apparatus as a first embodiment of an optical head apparatus of the present invention.

Figure 2:
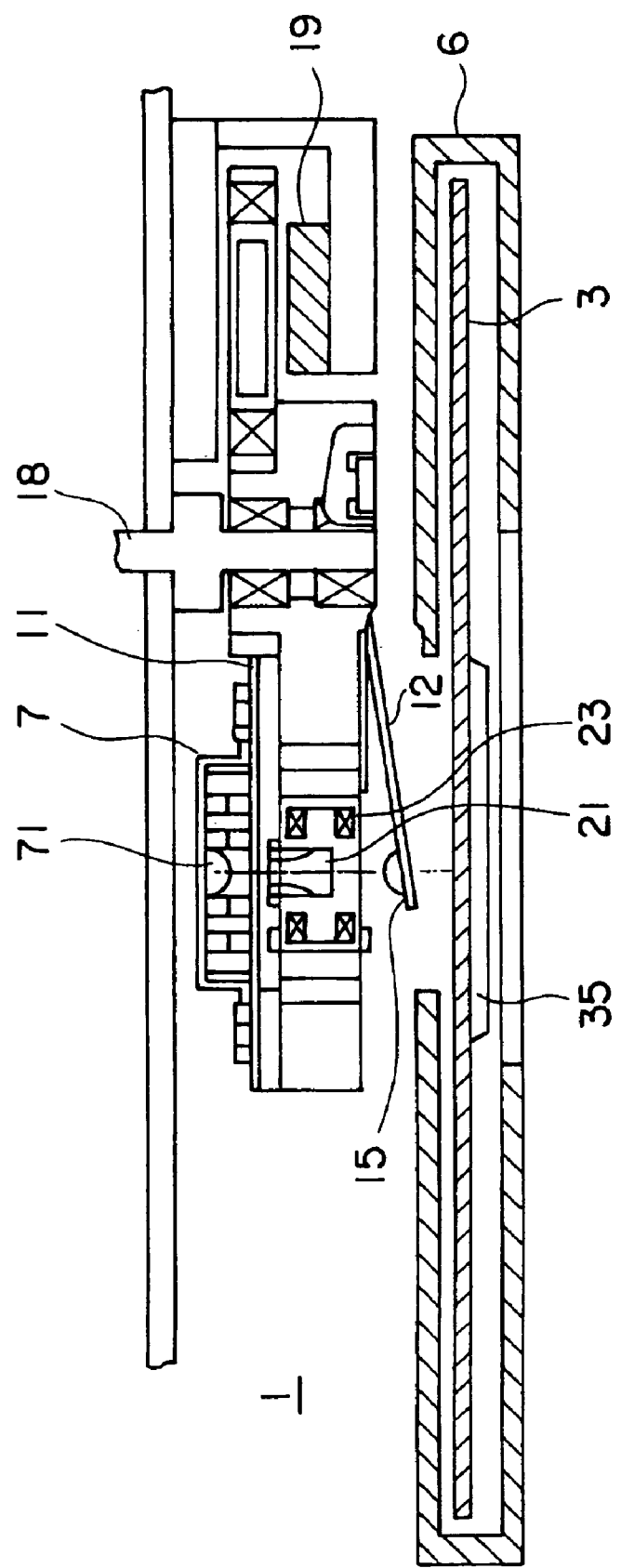
FIG. 2 is an enlarged view showing an example of an optical portion mounted on the magneto-optical head apparatus illustrated in FIG. 1B.

FIG. 2 is an enlarged view of the optical head apparatus illustrated in FIG. 1B.

Figure 3:
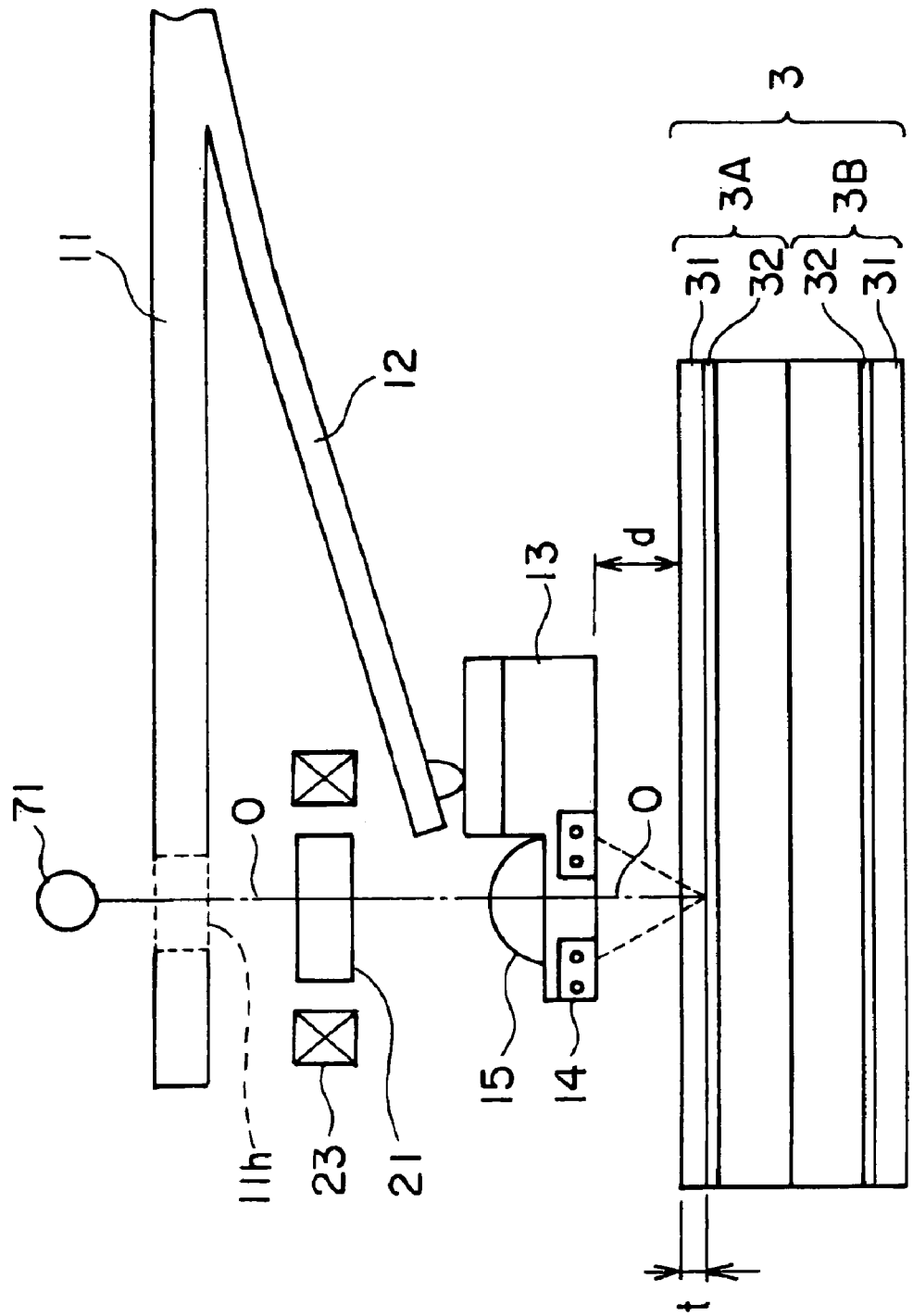
FIG. 3 is a schematic view showing the configuration of an optical system in the optical head apparatus illustrated in FIG. 1B.

FIG. 3 is a view showing an outline of the configuration of the optical head apparatus illustrated in FIG. 2.

Figure 4:
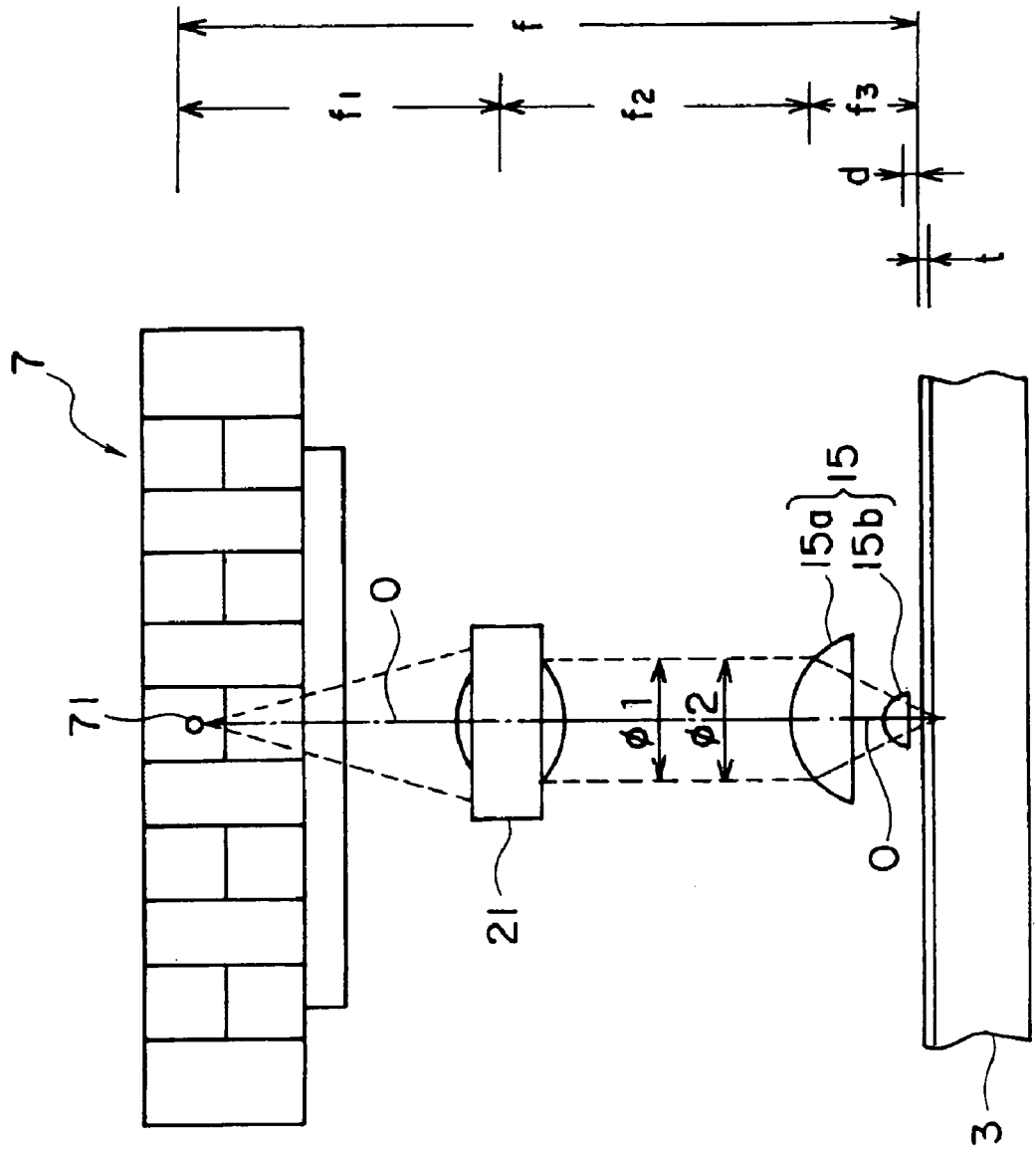
FIG. 4 is a view schematically showing details of the optical system illustrated in FIG. 3.

FIG. 4 is a view showing an outline of the configuration of an optical system of the optical head apparatus illustrated in FIG. 3.

Figure 5:
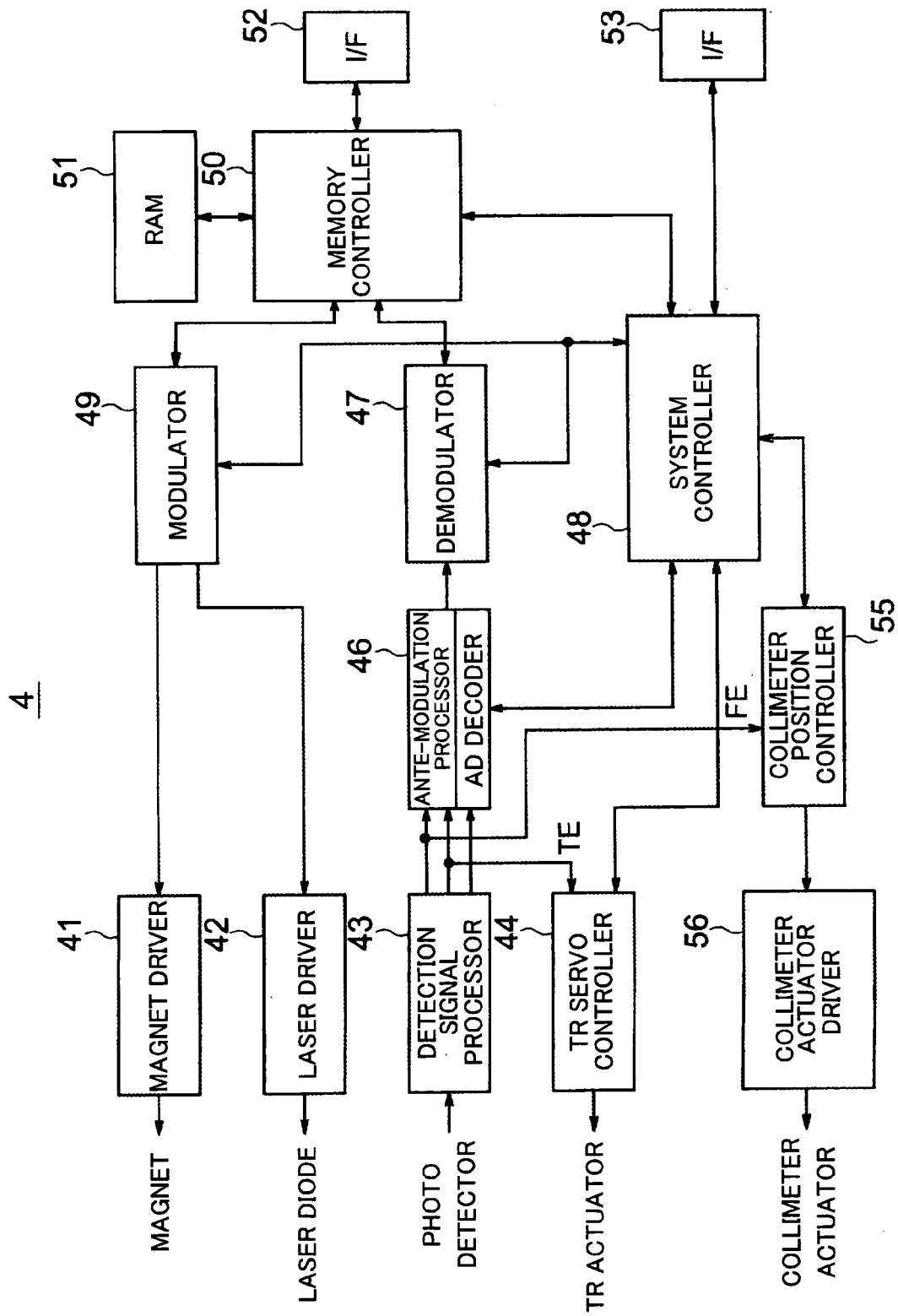
FIG. 5 is a view of the configuration of a control apparatus of the first embodiment of an optical recording/reproducing apparatus of the present invention.

FIG. 5 is a view of the configuration of a control apparatus for controlling driving of the magneto-optical head apparatus of the first embodiment of the present invention.

When combining the magneto-optical head apparatus illustrated in FIG. 1 to FIG. 4, an MO disk and the control apparatus illustrated in FIG. 5, the magneto-optical recording/reproducing apparatus of the first embodiment of an optical recording/reproducing apparatus of the present invention is obtained.

As an example of a rotary body of the present invention, a magneto-optical (MO) disk case 6 is attached to the optical recording/reproducing apparatus, a magnetic grip 35 of the MO disk 3 is magnetically gripped (chucked) to be fixed to the optical recording/reproducing apparatus, then, when a window 63 opens by opening a shutter 61 of the MO disk case 6, the MO disk 3 directly faces to an object lens 15 of the magneto-optical head apparatus 1.

The magneto-optical head apparatus 1 is moved to rotate in the radial direction of the MO disk 3 by a voice coil motor (VCM) 19 about an axis 18 as the rotation center. Namely, the voice coil motor (VCM) 19 is an actuator for performing tracking control.

After being chucked, the MO disk 3 is rotated by a not shown spindle motor and used for reading and writing data.

Configuration of Magneto-Optical Head Apparatus

A magneto-optical head apparatus 1 comprises, as shown in FIG. 1B to FIG. 3, a hybrid optical apparatus 7 having a light source 71 provided on an upper portion of a fixed arm 11, a magnetic modulation coil 14 and an object lens 15 fixed to a slider 13 fixed at an end of a suspension (suspending member) 12 having a free end downward suspending from an arm 11 due to its own weight, a collimator lens 21 positioned between the light source 71 of the hybrid optical apparatus 7 and the object lens 15, and a collimator lens actuator 23 for moving the collimator lens 21.

In the present embodiment, the collimator actuator 23 is an electromagnetic actuator using an electromagnet.

In the magneto-optical head apparatus 1, one end of the suspension 12 is fixed to the arm 11 in a horizontal state as illustrated, and the other end (free end) is provided with the slider 13. The slider 13 is mounted with the object lens 15 and the magnetic modulation coil 14. In the interest of illustrating, the slider 13 and the magnetic modulation coil 14 illustrated in FIG. 3 are not shown in FIG. 1B and FIG. 2.

The slider 13 provided to the free end of the suspension 12 recedes to be away from the arm 11 and lowers due to weight of the slider 13 mounted with the magnetic modulation coil 14 and the objection lens 15 and contacts a topcoat (cover coat) 31 surface of an MO disk 3 when the MO disk 3 does not rotate, while when the MO disk 3 rotates, the wind pressure (or an air pressure: also called air bearing) makes the slider 13 float exactly by a float distance "d". Accordingly, the magneto-optical head apparatus 1 is a flying head type (head floating type) magneto-optical head apparatus.

Around an optical axis O-O connecting the light source 71, the collimator lens 21 and the object lens 15, a light transparent hole 11h is formed at a position of the arm 11 where the light source 71 faces the collimator lens 21, so that a light beam from the light source 71 enters the collimator lens 21, and a returned-back light from the MO disk 3 reaches the hybrid optical apparatus 7 from the collimator lens 21.

The object lens 15 is two-combined lenses composed of two converging lenses 15a and 15b as illustrated in FIG. 4 in the present embodiment. When the object lens 15 is configured by combining the two converging lenses 15a and 15b in this way, high numerical aperture of, for example, 0.8 or more, 1 or more in some cases can be attained as in the case of being used in near field recording or far field recording.

The slider 13 has to be as light as possible because the slider 13 is floated from the surface of the MO disk 3 by a wind pressure caused by rotation of the MO disk 3. However, the object lens 15 composed of two converging lenses 15a and 15b and the magnetic modulation coil 14 have to be close to the MO disk 3, so that the object lens 15 and the magnetic modulation coil 14 are mounted on the slider 13 close to the MO disk 3. The slider 13, the magnetic modulation coil 14 and the object lens 15 have to have as light weight as possible and small dimensions. The suspension 12 is made by a soft and elastic material or made to be a shape giving elasticity.

MO Disk

As an optical rotary recording medium of the present invention, an example of using an MO disk 3, a section of which is illustrated in FIG. 3 will be described in the present embodiment.

The MO disk 3 in FIG. 3 is an MO disk obtained by putting two MO disks 3A and 3B together, and a recording film 32 is formed under a topcoat (cover coat) 31 having a thickness of "t" in each of the two MO disks 3A and 3B.

Figure 17:
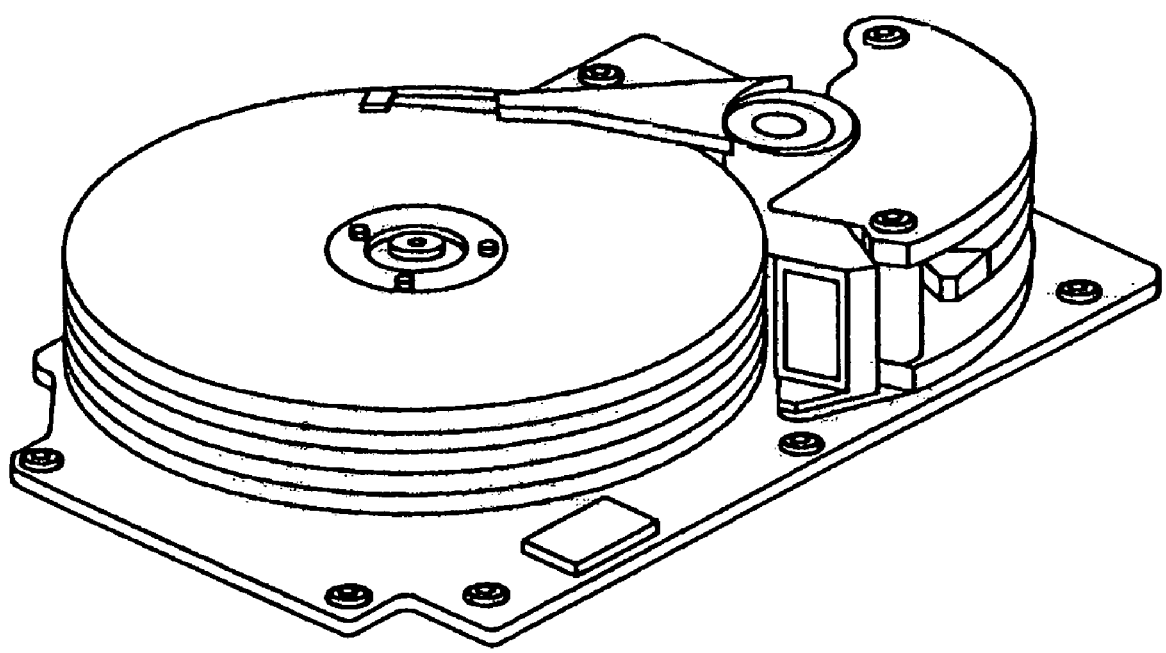
FIG. 17 is a partial perspective view of an optical recording/reproducing apparatus as the seventh embodiment of an optical recording/reproducing apparatus of the present invention, wherein optical rotary recording media are stacked to be multilayer, for performing writing and reading of data to and from the plurality of optical rotary recording media at a time.

Since the MO disk 3 obtained by putting the two MO disks 3A and 3B together is shown as an example, application to an optical head apparatus to be explained with reference to FIG. 17 is also considered. In the present embodiment, it is not required to be a double-sided access type MO disk 3 but a one-side MO Disk 3A is sufficient.

A light beam emitted from a light source 71 of a hybrid optical apparatus 7 is made to be a parallel beam by the collimator lens 21, the beam light converged by the object lens 15 passes through the topcoat 31 to be converged on the recording portion 32, and a returned-back beam from the recording portion 32 returns to the hybrid optical apparatus 7 via the object lens 15 and the collimator lens 21.

Hybrid Optical Apparatus

The hybrid optical apparatus 7 comprises an optical system, such as a light source 71, such as a laser diode, a photo detector (PD) for detecting a returned-back light from the recording portion 32, and a beam spritter for directing a light beam from the light source 71 to the collimator lens 21 and guiding a returned-back light reflected on the recording portion 32 and returned via the collimator lens 21 to the photo detector, etc. The photo detector is, for example, a well known four divided photo detector.

Ray Trace

An outline of a ray trace of the optical system in the magneto-optical apparatus 1 will be explained with reference to FIG. 1 to FIG. 4.

A light emitted from the light source 71 of the hybrid optical apparatus 7 passes through a light transparent hole 11h of the arm 11 to enter the collimator lens 21 and made to be a parallel light beam having a diameter of $\phi 1$ by the collimator lens 21. The parallel light beam emitted from the collimator lens 21 enters a first converging lens 15a of the object lens 15 having a valid aperture of $\phi 2$ to be converged, and the converged light beam further enters the second convergence lens 15b and focuses on the recording portion 32 via the topcoat 31 having a thickness of "t" of the MO disk 3.

The light beam reflected on the recording portion 32 passes through the topcoat 31 to inversely proceed the second converging lens 15b and the first converging lens 15a, enters the collimator lens 21, passes through the collimator lens 21, and enters a light receiving system of the hybrid optical apparatus 7.

Conditions of Optical System

In such a ray trace, the collimator lens 21 is provided on an optical axis O-O at a position by which the focal position f1 positions approximately at a light emission point of the light source 71. Also, when assuming that a parallel light is emitted from the light source 71, the collimator lens 21 is provided on the optical axis O-O at a position by which an incident iris of the object lens 15 positions at the focal position f2. The incident iris of the object lens 15 is at a position that the parallel beam having a diameter of $\phi 2$ enters the first converging lens 15a of the object lens 15.

Preferably, f1=f2 or f1≈f2. Namely, the collimator lens 21 is positioned approximately middle of the light source 71 and the object lens 15.

A spread light beam is emitted from the light source 71 and formed to be a parallel beam by the collimator lens 21. The diameter of the parallel beam formed by the collimator lens 21 is indicated by $\phi 1$.

A distance f3 between the converging lenses 15a and 15b is regulated by an index of refraction and NA of the converging lenses 15a and 15b.

Table 1 and Table 2 show examples of values of the optical system shown in FIG. 4.

TABLE 1

| Hybrid Optical Apparatus | | |
|---|---|---|
| Light source wavelength | 405 nm | 655 nm |
| Collimeter lens | | |
| Focal distance f1 | 3.2 mm | 3.2 mm |
| NA | 0.21 | 0.18 |
| Object lens | | |
| NA | 0.9 | 0.9 |
| f3 | 1.2 mm | 1.2 mm |
| Focal distance f1 | 3.2 mm | 3.2 mm |
| Focal distance f2 | 3.2 mm | 3.2 mm |
| Focal distance f3 | 1.2 mm | 1.2 mm |

TABLE 1-continued

| Float distance d | 0.3 to 0.5 μm | 0.3 to 0.5 μm |
|---|---|---|
| Total distance f | 7.6 mm | 7.6 mm |
| Topcoat thickness | 0.5 μm | 0.5 μm |

The collimator lens 21 is provided basically at a position of f1=f2 or f1≈f2 as explained above, and the position is finely adjusted between the light source 71 and the object lens 15 in a range of, for example, ±100 to ±200 μm or so by using a collimator lens actuator 23 as will be explained later on.

In the present embodiment, the collimator lens actuator 23 is an electromagnetic actuator using an electromagnet and moves the collimator lens 21 along the optical axis O-O between the light source 71 and the object lens 15.

Control Apparatus

The control apparatus illustrated in FIG. 5 comprises a magnet driver 41, a laser driver 42, a detection signal processor 43, a tracking servo controller 44, an ante-demodulation processor 46, a demodulator 47, a system controller 48, a modulator 49, a memory controller 50, a RAM 51, interfaces 52 and 53 for performing signal transfers to and from a not shown host computer, a collimator lens position controller 55, and a collimator lens actuator driver 56.

The magnet driver 41 drives the magnetic modulation coil 14 in accordance with a signal from the modulator 49 when writing data to the MO disk 3.

The laser driver 43 drives a laser diode as a light source 71 in the hybrid optical element 7 in accordance with data writing or data reading.

The detection signal processor 43 receives a detection signal from a photo detector, such as a four divided detector, provided to the hybrid optical element 7 and calculates a tracking error signal, a focus error signal and an RF signal, etc. by a well known method.

The tracking servo controller 44 refers to a tracking error signal detected by the detection signal processor 43 and drives the voice coil motor 19 to perform tracking control of a magneto-optical head 1.

The collimator lens actuator driver 62 drives the collimator lens actuator 23 based on a control signal from the system controller 48.

Focus Control

Since the slider 13 of the magneto-optical head apparatus 1 floats due to a wind pressure caused by rotation of the MO disk 3, a distance of the object lens 15, particularly the second converging lens 15b being close to the MO disk 3 from a surface of the MO disk 3 is normally maintained to be a predetermined value "d". Namely, in the present embodiment, focus control is attained by the flying head in principle.

In actually, however, the float distance "d" of the second converging lens 15b from the surface of the MO disk 3 is very short but it fluctuates at a high speed.

An optical axis between the light source 71 in the hybrid optical apparatus 7 fixed to the arm 11 and the object lens 15 composed of the converging lenses 15a and 15b mounted on the slider floating from the MO disk due to air bearing caused by rotation of the MO disk 3 may shift with respect to the original optical axis O-O.

The optical axis shift is caused by various reasons. For example, production variation of an optical head apparatus, variation at adjustment, changes due to temperature changes or time, a fine width of the floating distance "d" of the optical head apparatus, etc. cause the optical axis shift.

The optical axis shift declines areas of the incident irises of the collimator lens 21 and the object lens 15. Namely, it causes "kick" to the incident iris of the collimator lens 21 by the light beam entering to the collimator lens 21 from the light source 71 or "kick" to the incident iris of the object lens 15 of a parallel beam light entering to the object lens 15 from the collimator lens 21. The similar "kick" phenomenon is naturally caused to a returned-back light reflected on the recording portion 32 of the MO disk 3.

The optical axis shift caused at the time of being produced or adjusted among the above optical axis shifts becomes a value close to a DC offset of a focus error. Also, the optical axis shift due to temperature changes relatively slowly. The optical axis shift due to changes over time changes very slowly.

The above optical axis shifts are shown as an offset in a focus error detection signal.

Thus, in the present embodiment, the collimator lens position controller 55 receives a focus error signal FE from the detection signal processor 43 and detects a DC offset, drives the collimator lens actuator 23 via the collimator lens actuator driver 56 to cancel the DC offset, so that a position of the collimator lens 21 is adjusted vertically along the optical axis O-O.

As explained above, the float distance "d" of the second converging lens 15b from the surface of the MO disk 3 is very short but fluctuating at a high speed, however, control by the collimator lens position controller 55 may be relatively slowly performed. For example, control by the collimator lens position controller 55 is one minute period.

Consequently, optical axis shift due to production variation of an optical head apparatus, variation at adjustment, changes due to temperature changes or time, and a fine width of the floating distance "d" of the optical head apparatus, etc. explained above is compensated, so that accurate focus control can be realized. Also, a detection signal by the control becomes highly accurate.

Tracking Control

The tracking servo controller 44 receives as an input a tracking error signal calculated in the detection signal processor 43 and drives the voice coil motor 19 as a tracking actuator to make the tracking error "0". As a result, the arm 11 rotatably attached to the axis 18 is rotated on a face in parallel with the surface of the MO disk 3 (or in the perpendicular direction with respect to the paper surface). By this rotation of the arm 11, tracking control is performed on tracks on the MO disk 3.

The hybrid optical apparatus 7 mounted on the arm 11, the collimator lens 21 mounted on the arm 11 and the collimator lens actuator 23, the slider 13 mounted on the suspension 12, and the magnetic modulation coil 14 and the object lens 15 composed of the first and second converging lenses 15a and 15b mounted on the slider 13 move integrally. In the present embodiment, being different from the prior art explained above, since a distance between the object lens 15 and the hybrid optical apparatus 7 is short and an optical fiber, etc. is unnecessary, the optical coupling efficiency is high and reliability is also high.

When receiving an instruction of reading or writing from a host computer or other external apparatus via the interface 53, the system controller 48 controls the memory controller 50, the modulator 49, the ante-demodulation processor 46 and demodulator 47, and the tracking servo controller 44, etc. in accordance with the reading or writing.

When writing data, data to be written to the MO disk 3 is recorded in the memory controller 50 via the interface 52 and temporarily stored in the RAM 51. Inversely, when reading data, data read and reproduced from the MO disk 3 by the photo detector in the hybrid optical apparatus 7, the detection signal processor 43, the ante-demodulation processor 46 and the demodulator 47 is temporarily stored in the RAM 51 via the memory controller 50 and sent to the upper host computer via the interface 52.

The modulator 49 is driven by the system controller 48 when writing data and performs error correction code (ECC) addition, run length limitation (RLL), and modulation processing (coding processing), such as NRZI or NRZ, on the data read from the RAM 51.

The ante-demodulation processor 46 comprises an A/D conversion circuit, an equalizer circuit, a phase locked loop circuit (PLL) and a Viterbi demodulation circuit, etc. The ante-demodulation processor 46 operates when reading data.

The A/D conversion circuit converts an analog signal calculated in the detection signal processor 43 to a digital signal.

The equalizer circuit equalizes the signal converted to a digital signal.

The PLL reproduces a clock signal.

The Viterbi demodulation circuit demodulates a signal recorded in the MO disk 3 from an RF signal by using a reproduced clock.

The ante-demodulation processor 46 also comprises an address decoder and calculates from a signal from the detection signal processor 43 an address on the MO disk 3 where the object lens 15 of the magneto-optical head apparatus 1 positions.

The demodulator 47 operates when reading data, performs inverse processing of the modulation processing in the modulator 49 on the data demodulated in the ante-demodulation processor 46, reproduces the original data and transmits to the memory controller 50.

Hybrid Optical Apparatus

As explained above, the hybrid optical apparatus 7 comprises an optical system, such as a light source 71, a photo detector (PD) and a beam spritter, but it may be configured to comprise a magnet driver 41, a laser driver 42, a detection signal processor 43, a collimator lens actuator driver 56, etc. which will be explained with reference to FIG. 5. As a result, a servo signal, such as a focus error signal, tracking error signal and an RF signal, can be generated in the hybrid optical apparatus 7.

Similarly, the tracking servo controller 44 may be incorporated inside the hybrid optical apparatus 7 or also provided to a fixed portion being away from the magneto-optical head apparatus 1 integrated with the ante-demodulation processor 46 and the system controller 48.

Being different from the suspension 12 on which the slider 13 which floats due to a wind pressure caused by rotation of the MO disk 3 is fixed, the hybrid optical apparatus 7 is fixed to the arm 11, so that it has less limitation on weight and the part can be provided near a driving object.

In the present specification, the overall optical system of the magneto-optical head apparatus 1 includes the topcoat 31 on the surface of the MO disk 3 and comprehensively indicates the object lens 15, the hybrid optical apparatus 7 and various optical elements not shown in FIG. 1 to FIG. 4. Accordingly, in the present specification, an optical system does not only mean the hybrid optical apparatus 7.

Operation of Magneto-Optical Recording/Reproducing Apparatus

An operation of a magneto-optical recording/reproducing apparatus of the present embodiment will be explained.

The MO disk 3 is rotated at a predetermined rotation rate by a not shown spindle motor. Due to the rotation of the MO disk 3, the slider 13 of the magneto-optical head apparatus 1 floats exactly by a predetermined distance from the surface of the MO disk 3.

When a data writing request is given from the host computer to the system controller 48 via the interface 53, the system controller 48 activates the memory controller 50 to record in the RAM 51 write data transferred via the interface 52. In parallel with the operation, the demodulator 47 controls the tracking servo controller 44 and the modulator 49. The details will be explained below.

The system controller 48 drives the tracking servo controller 44 and makes the magneto-optical head 1 position at a specified address on the MO disk 3 (performs tracking control). During the tracking operation, all parts mounted on the arm 11 driven by the voice coil motor 19, that is, the hybrid optical apparatus 7, the collimator lens actuator 23 and the collimator lens 21, the suspension 12, the slider 13, the magnetic modulation coil 14, and the object lens 15, integrally move to the direction in parallel with the surface of the MO disk 3.

When in an on-track state, the system controller 48 transmits the write data recorded in the RAM 51 to the modulator 49 via the memory controller 50.

The modulator 49 performs various modulation processing explained above on the input write data.

The magnet driver 41 drives the magnetic modulation coil 14 based on a modulation result in the modulator 49. As a result, the magnetic modulation coil 14 mounted on the slider 13 floating from the MO disk 3 by exactly a predetermined distance "d" modulates the magnetic field of the recording film 32 of the MO disk 3 below.

The laser driver 42 drives the light source 71, for example, a laser diode in the hybrid optical apparatus 7 based on the modulation result in the modulator 49.

Data writing is performed as a result that a laser beam light emitted from the light source 71 enters the collimator lens 21 and made to be a parallel beam light, enters the object lens 15 to be converged, and irradiates the recording film 32 of the MO disk 3.

When data reading request is sent from the host computer to the system controller 48 via the interface 53, the system controller 48 drives the tracking servo controller 44 and makes the magneto-optical head 1 position at a specified address on the MO disk 3.

In an on-track state, the system controller 48 drives the demodulator 47, and the ante-modulation processor 46 demodulates to not modulated or not coded original data from the decoded data recorded in the MO disk 3.

The demodulated data is temporarily recorded in the RAM 51 via the memory controller 50 and, when a predetermined amount of data is accumulated, sent to the host computer via the interface 52.

As explained above, when using the magneto-optical head apparatus 1 of the present embodiment, since the object lens 15 and the magnetic modulation coil 14 mounted on the slider 13 suitably float from the MO disk 3, focus control becomes basically unnecessary. Accordingly, time spent for focus control is unnecessary and the response time is short.

Particularly, according to the first embodiment of the present invention, accurate focus control and a ray trace by a valid beam light are established by the collimator lens 21 whose position is adjusted by the electromagnetic collimator lens actuator 23.

Figure 21:
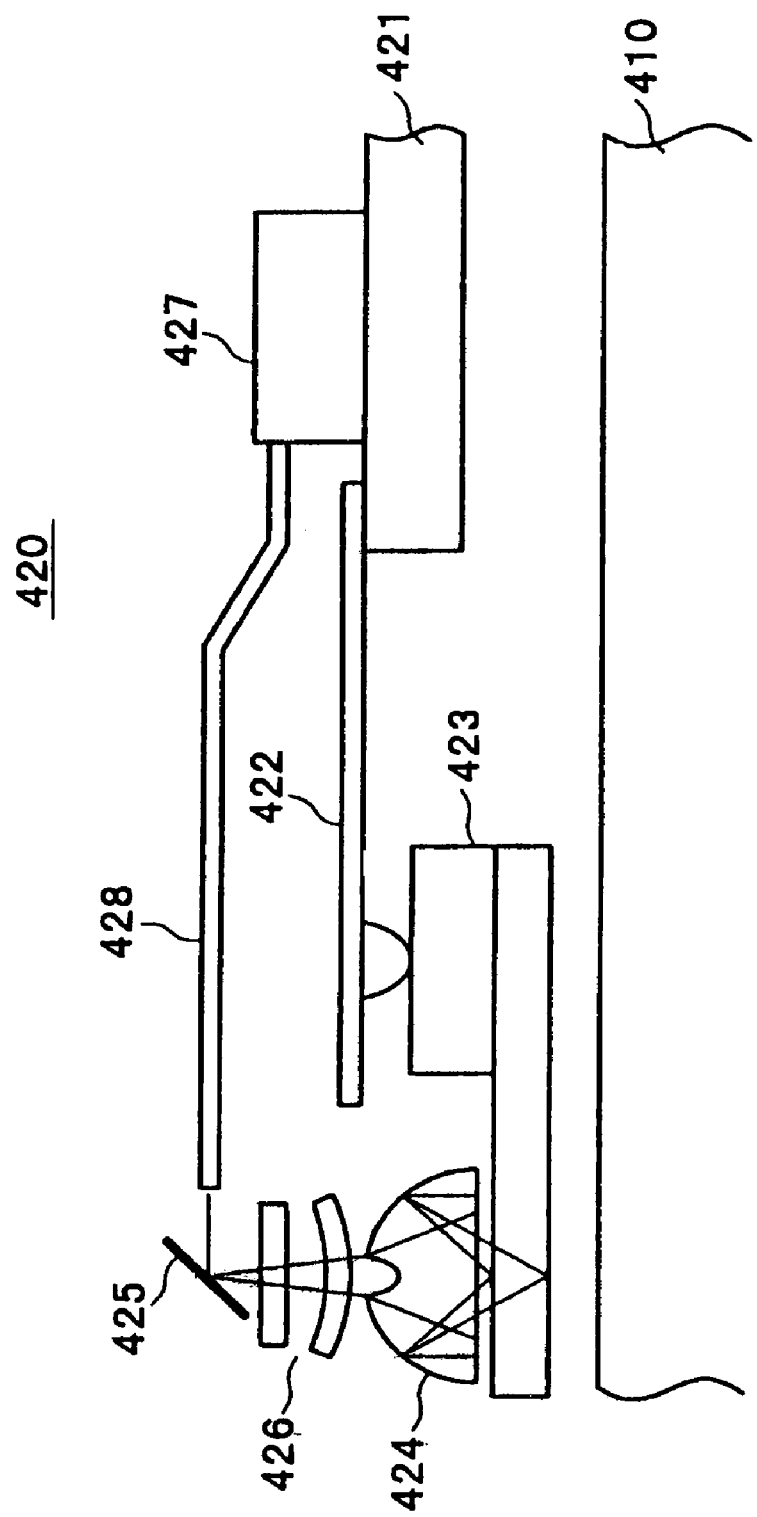
FIG. 21 is a view of the configuration of a magneto-optical head as a third prior art.
Figure 22:
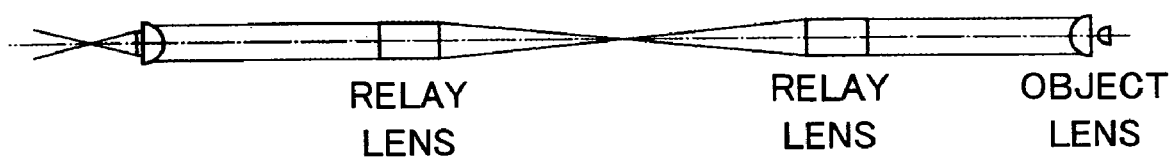
FIG. 22 is a view of the configuration of relay lenses as a fourth prior art.

The configuration of making the collimator lens 21 movable along the light axis O-O by using the collimator lens 21 and the collimator actuator 23 in the present embodiment can be made more compact comparing with the case of using relay lenses illustrated in FIG. 21.

The hybrid optical apparatus 7 housing the light source 71, the photo detector and other optical system positions immediately above the object lens 15 mounted on the slider 13, so that a length of the optical system can be made short, the optical coupling efficiency is high, and the magneto-optical head apparat embodiment, thduced to be compact.

Furthermore, in the present embodiment, these move integrally during tracking control, so that a problem caused by separation of the optical portion, the object lens and the magnetic modulation coil in the prior art explained above is overcome.

Since the hybrid optical apparatus 7 is attached not to the floating suspension 12 but to the arm 11, the hybrid optical apparatus 7 does not effect on the focus control. Namely, in the magneto-optical head apparatus 1 of the present embodiment, there is a little limitation on the weight, constraint, dimensions, etc. of the hybrid optical apparatus 7. Therefore, the configuration of the hybrid optical apparatus 7 can be made freely.

Since the magneto-optical head 1 can be made very compact, it can be applied as a magneto-optical head of a compact magneto-optical disk, such as a recent MO disk of 5 inches or less.

MODIFICATION OF FIRST EMBODIMENT

Modifications of the magneto-optical head apparatus 1 and the control apparatus 4, etc. of the first embodiment of the present invention will be explained.

FIRST MODIFICATION OF FIRST EMBODIMENT

In the above embodiment, the case of performing tracking control by rotating the arm 11 by the voice coil motor 19 was explained, but it may be configured to perform tracking control by a forward or backward straight movement of the arm 11 in the axis direction by using the voice coil motor or other actuator. Accordingly, the driving method of the arm 11 is not limited to the rotating method.

As the configuration of conducting the straight movement, a variety of well known techniques can be applied, such as the configuration of conducting with one axis, the configuration of conducting with two axes.

SECOND MODIFICATION OF FIRST EMBODIMENT

In the above embodiment, an example of mounting the magnetic modulation coil 14 on the slider 13 was explained, but other magnetic field application means can be suitably mounted in accordance with a rotary recording medium and a recording method.

THIRD EMBODIMENT OF FIRST EMBODIMENT

In the above embodiment, the case where the object lens 15 was composed of two converging lenses 15a and 15b was explained, but the present invention can be applied to the case with only one object lens.

SECOND EMBODIMENT

A second embodiment of the optical head apparatus of the present invention and an optical recording/reproducing apparatus using the same will be explained with reference to FIG. 6 and FIG. 7.

Figure 6:
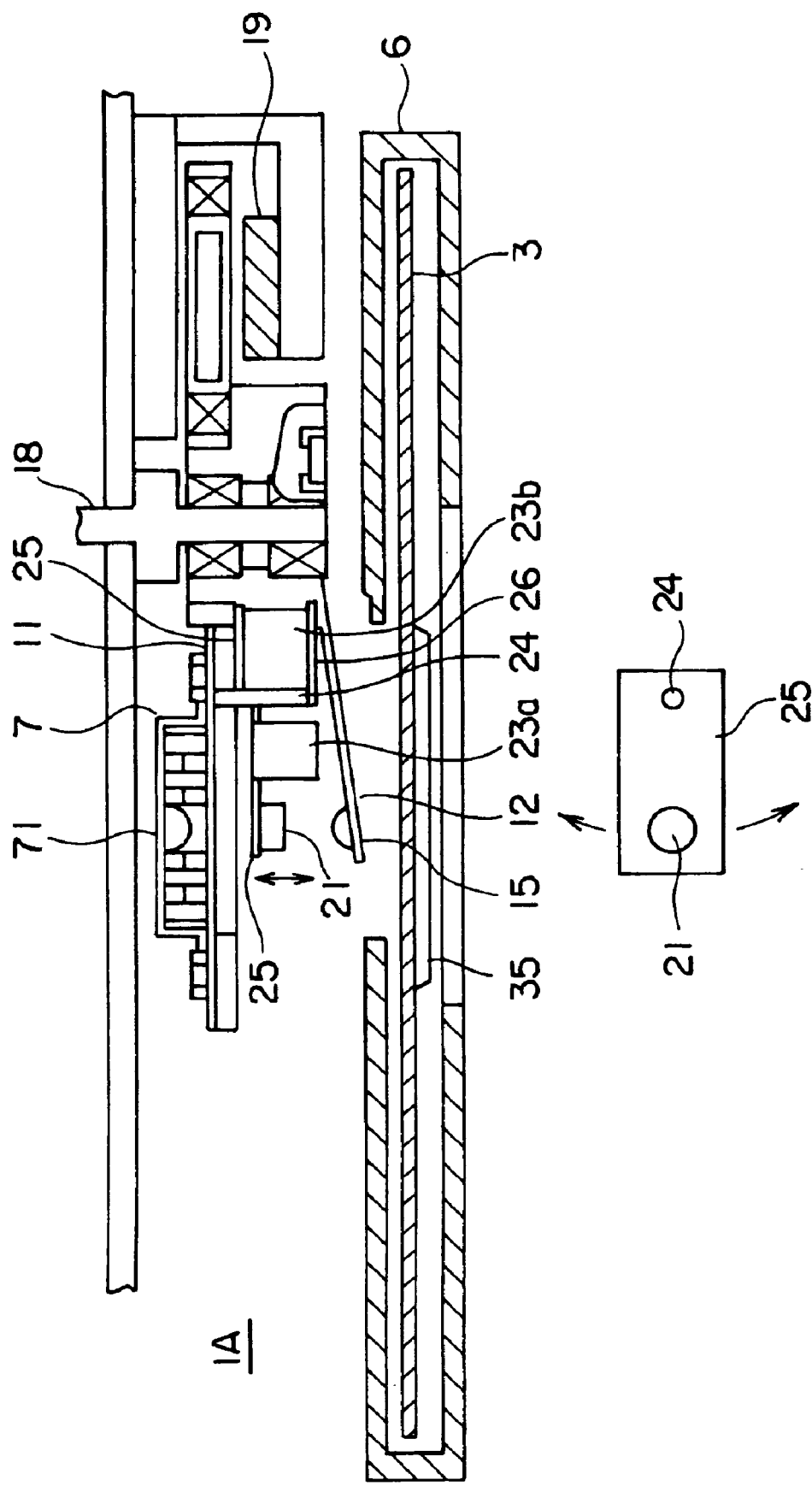
FIG. 6 is a sectional view of the configuration of a magneto-optical head apparatus as a second embodiment of an optical head apparatus of the present invention.

FIG. 6 is a sectional view of the configuration of the magneto-optical head apparatus as a second embodiment of the optical head apparatus of the present invention.

Figure 7:
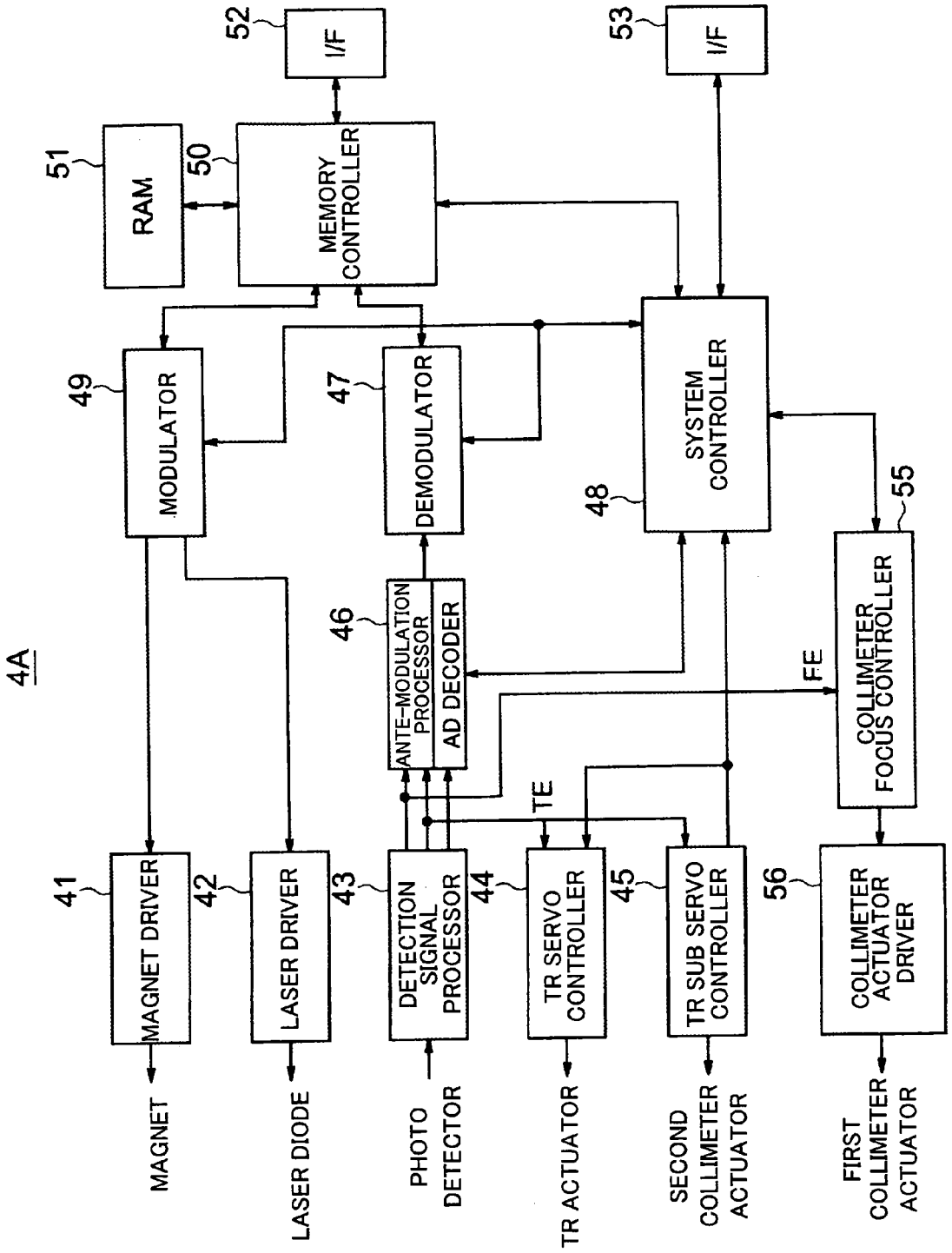
FIG. 7 is a view of the configuration of a control apparatus of a second embodiment of an optical recording/reproducing apparatus of the present invention.

FIG. 7 is a view of the configuration of a control apparatus for performing drive control on the magneto-optical head apparatus of the second embodiment of the present invention.

FIG. 6 is a sectional view of a magneto-optical head apparatus 1A corresponding to the magneto-optical head apparatus 1 illustrated in FIG. 1B to FIG. 4.

In the magneto-optical head apparatus 1A in FIG. 6, in addition to giving a vertical movement along the optical axis by using a first collimator lens actuator 23a for moving a position of the collimator lens 21 between the light source 71 and the object lens 15 in the same way as in the collimator lens actuator 23 of the first embodiment to the magneto-optical head apparatus 1 of the first embodiment, fine rotation in the direction of traversing tracks of the MO disk 3 about the axis 24 is given by using a second collimator lens actuator 23B.

In the present embodiment, the first and second actuators 23a and 23b are electromagnetic actuators using an electromagnet.

It is configured to attach the axis 24 rotatably between a lower plate 26 and an arm 11, attach the second collimator lens actuator 23b to the lower plate 26, fix an upper plate 25 to the axis 24 by penetrating it, attach a member for rotating in accordance with a magnetic force of the second collimator lens actuator 23b at a position facing to the second collimator lens actuator 23b on the lower surface of the upper plate 25, fix the first collimator lens actuator 23a and the collimator lens 21 on the other side of the upper plate 25, so that the first collimator lens actuator 23a and the collimator lens 21 rotate together in accordance with a rotation movement of the axis 24 and the collimator lens 21 can move vertically by the first collimator lens actuator 23a.

The member provided on the upper plate 25 facing to the second collimator lens actuator 23b is, for example, a permanent magnet. As a result, the collimator lens 21 and the first collimator lens actuator 23a fixed to the upper plate 25 rotate about the axis 24.

The movement of the collimator lens 21 in the vertical direction by the first collimator lens actuator 23a is the same as that in the first embodiment.

The control apparatus for performing drive control on the magneto-optical head apparatus of the second embodiment of the present invention illustrated in FIG. 7 is added with a tracking sub servo controller 45 in addition to the tracking servo controller 44 and drives the second collimator lens actuator 23b with the tracking sub servo controller 45, so that it can finely rotate in the direction of traversing the tracks of the MO disk 3 about the axis 24.

The collimator lens position controller 55 and the collimator lens actuator driver 56 drive the first collimator lens actuator 23a in the same way as in the first embodiment, so that the collimator lens 21 can move vertically along the optical axis.

The tracking sub servo controller 45 receives as an input a tracking error signal TE from the detection signal processor 43 to correct shift of a beam light with respect to the optical axis O-O, generates a control signal to compensate the optical axis shift, drives the second collimator lens actuator 23b, and rotates the collimator lens 21 exactly by a fine angle about the axis 24. On the other hand, the tracking servo controller 44 performs the above normal tracking control.

The control by the tracking sub servo controller 45 is performed for a relatively long period, for example one minute period, in the same way as the control by the collimator lens position controller 55.

According to the second embodiment of the present invention, in the same way as in the first embodiment, in addition to adjustment of the optical system in the vertical direction between the light source 71 and the object lens 15, fine adjustment of the optical system in the horizontal direction or the tracking direction becomes possible.

THIRD EMBODIMENT

A third embodiment of the optical head apparatus of the present invention and an optical recording/reproducing apparatus using the same will be explained with reference to FIG. 8 to FIG. 10.

Figure 8:
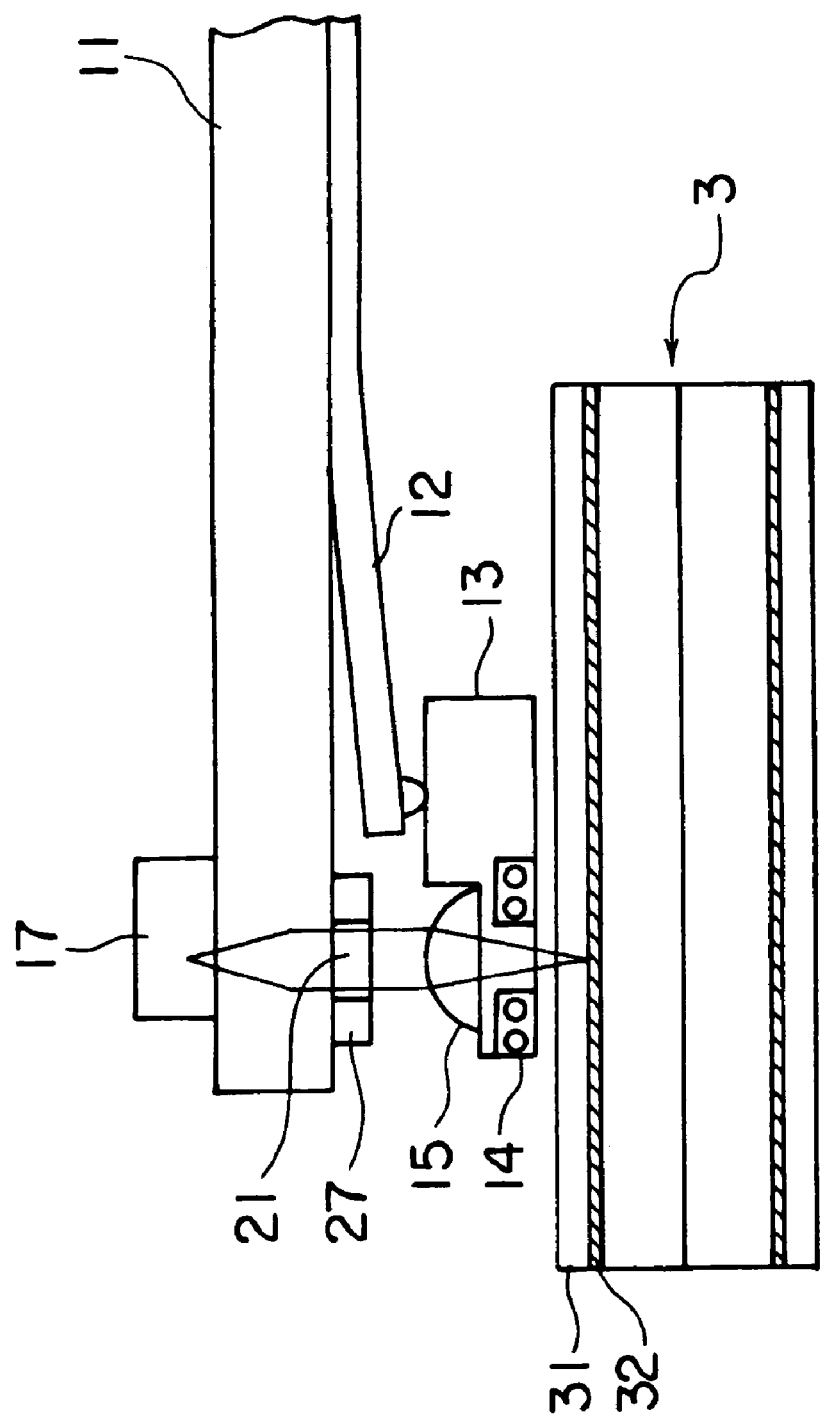
FIG. 8 is a sectional view of the configuration of a magneto-optical head apparatus as a third embodiment of an optical head apparatus of the present invention.

FIG. 8 is a sectional view of the configuration of a magneto-optical head apparatus as the third embodiment of the optical head apparatus of the present invention.

Figure 9:
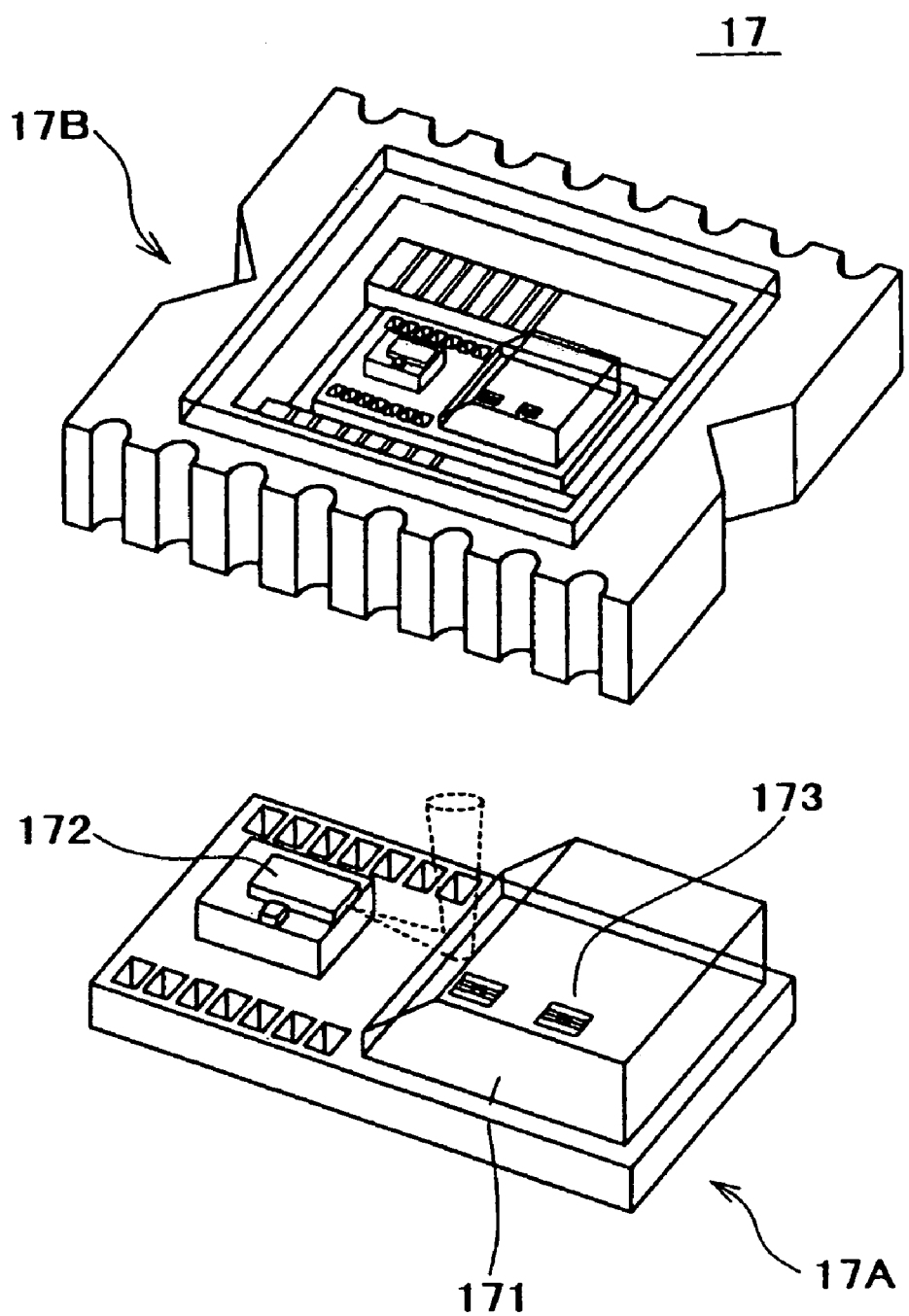
FIG. 9 is a schematic perspective view of an optical portion of the magneto-optical head apparatus illustrated in FIG. 8.

FIG. 9 is a view of the configuration of an optical portion in the magneto-optical head apparatus illustrated in FIG. 8.

Figure 10:
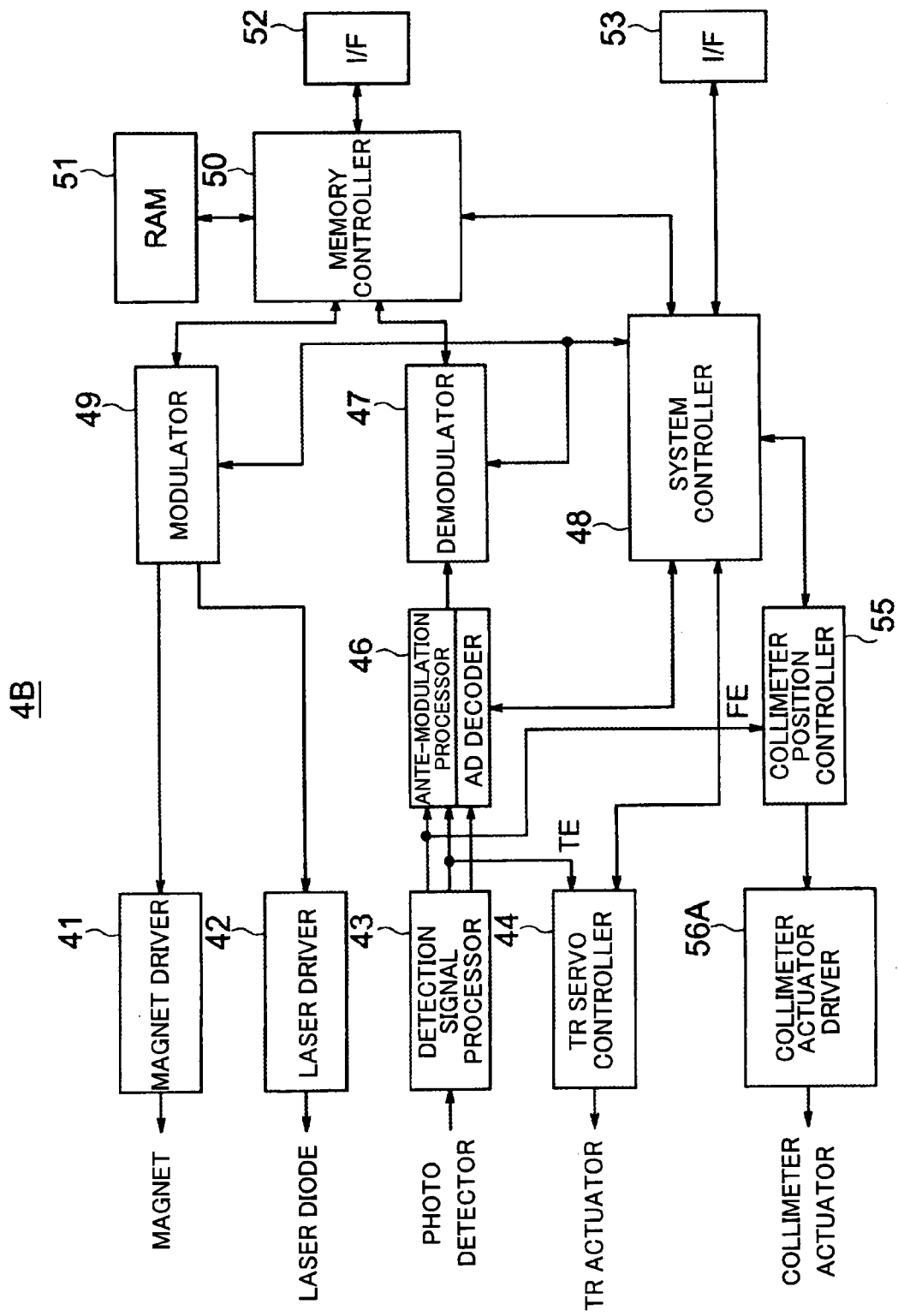
FIG. 10 is a view of the configuration of a control apparatus of the third embodiment of an optical recording/reproducing apparatus of the present invention.

FIG. 10 is a view of the configuration of the control apparatus for performing drive control on the magneto-optical head apparatus illustrated in FIG. 8.

The magneto-optical head apparatus 1B of the third embodiment will be explained. Note that explanations on common parts with those in the first embodiment and the second embodiment will be omitted except for key parts.

An optical portion 17 is fixed on the upper portion of the arm 11. A collimator lens 21 and the collimator lens actuator 27 are provided on the lower portion of the arm 11. A slider 13 is provided at a free end of a suspension 12 downward suspending from the arm 11, and the slider 13 is provided with an object lens 15 and a magnetic modulation coil 14. An MO disk 3 positions below the object lens 15.

The object lens 15 may be combined lenses of two converging lenses 15a and 15b or single lens as illustrated in FIG. 4.

The collimator actuator 27 of the present embodiment is different from the electromagnetic actuator of the first and second embodiments and is an actuator using a Piezo-effect element. The collimator actuator 27 using a Piezo-effect element will be explained.

A Piezo-effect element is an element which causes minute displacement when applying a voltage. Also, in the Piezo-effect element, an amount and direction of the displacement are defined by the crystal structure and direction of the applied voltage.

By applying a voltage to the Piezo-effect element of the collimator actuator 27, it is displaced in accordance with the applied voltage and moves the collimator lens 21 in the vertical direction. A displacement value δ of the collimator lens 21 is, for example, ±100 to ±200 μm or so, and the displacement value of the Piezo-effect element is sufficient to move the collimator lens 21. The applied voltage to the Piezo-effect element is a few volts to tens of volts.

There is an advantage that the collimator actuator 27 using a Piezo-effect element can be made more compact comparing with the case of using an electromagnet.

In terms of making it compact, more preferably, the collimator lens 21 and the collimator actuator 27 are configured to be one body and placed below the arm 11. Consequently, the magneto-optical head apparatus 1B can be configured to be furthermore compact. The collimator actuator 27 using a Piezo-effect element is compact and easily made to be one body with the collimator lens 21.

The optical portion 17 mounted on the arm 11 is a substitute of the hybrid optical apparatus 7 in the first and second embodiments, wherein, as illustrated in FIG. 9, the photo detector (PD) IC 17A integrating a micro-prism serving as a beam spritter, the laser diode (LD) as the light source 71, the photo detector (PD) 173 and a converging lens 174 is housed in an optical unit (package) 17B having a not shown ¼ wavelength plate therein.

An outline of a ray trace of the optical system in the magneto-optical head apparatus 1A will be explained with reference to FIG. 8 and FIG. 9.

A light emitted from the laser diode (LD) corresponding to the light source 71 in the hybrid optical apparatus 7 is reflected on the inclined surface of the micro-prism 171 and enters the collimator lens 21 positioned below that. In the interest of illustration, FIG. 9 is shown up side down, but the light beam emitted from the laser diode (LD) 172 and reflected on the inclined surface of the micro-prism 171 goes downward to enter the collimator lens 21.

Also in the present embodiment, positional relationship of the laser diode (LD) 172 (light source 71), the collimator lens 21 and the object lens 15 is the same as that illustrated in FIG. 4.

The control apparatus 4B illustrated in FIG. 10 is the same except that the collimator lens actuator driver 56A is for energizing a Piezo-effect element of the collimator actuator 27, while the collimator lens actuator driver 56 illustrated in FIG. 5 was for energizing the electromagnetic coil.

Comparing with the first embodiment using the electromagnetic collimator lens actuator 23A, the third embodiment is substantially the same as the first embodiment except for the point that the collimator actuator 27 using a Piezo-effect element is used in the present embodiment, wherein more accurate optical system is established by controlling the position of the collimator lens 21 in the focusing direction in the same way as in the first embodiment.

FOURTH EMBODIMENT

A fourth embodiment of the optical head apparatus of the present invention and an optical recording/reproducing apparatus using the same will be explained with reference to FIG. 11 and FIG. 12.

Figure 11:
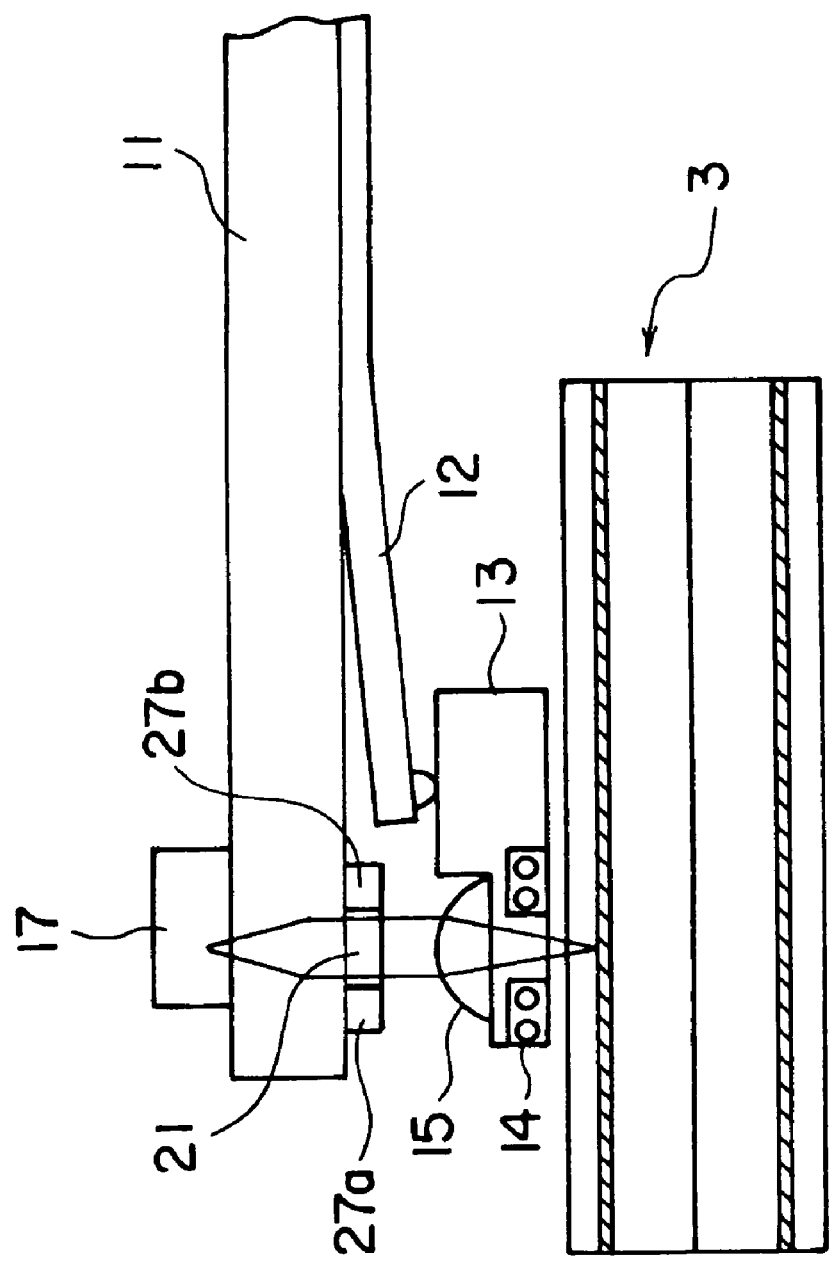
FIG. 11 is a sectional view of the configuration of a magneto-optical head apparatus as a fourth embodiment of an optical head apparatus of the present invention.

FIG. 11 is a sectional view of the configuration of the magneto-optical head apparatus as the fourth embodiment of the optical head apparatus of the present invention.

Figure 12:
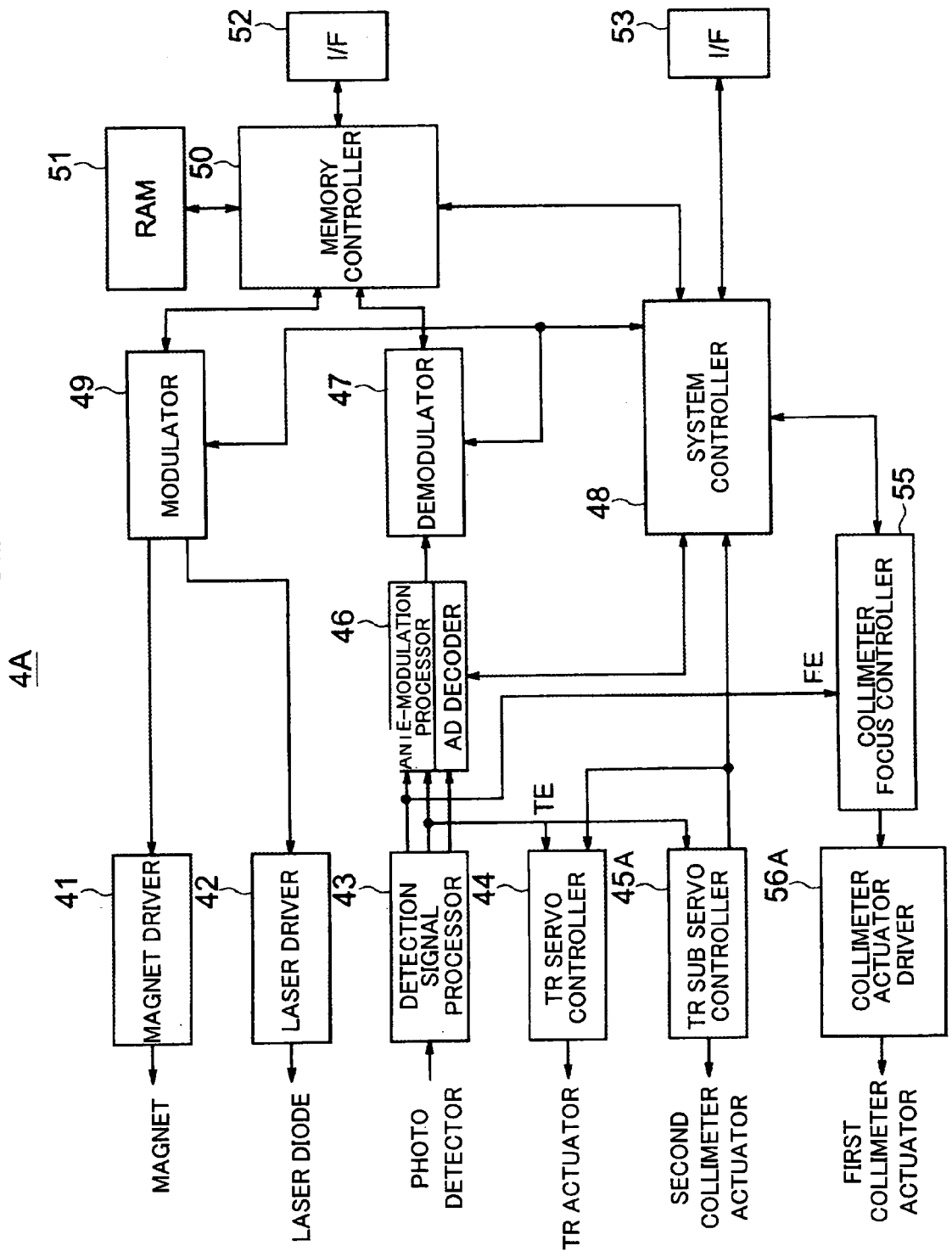
FIG. 12 is a view of the configuration of a control apparatus of the fourth embodiment of an optical recording/reproducing apparatus of the present invention.

FIG. 12 is a view of the configuration of a control apparatus for performing drive control on the magneto-optical head apparatus illustrated in FIG. 11.

The magneto-optical head apparatus IC of the fourth embodiment will be explained. Note that explanations on common parts with those in the first to third embodiments will be omitted except for key parts.

The magneto-optical head apparatus IC in FIG. 11 is provided with two Piezo-effect element type collimator lens actuators 27a and 27b for moving the collimator lens 21 in the focusing direction of the MO disk 3 and moving in the track direction of the MO disk 3.

While the collimator lens actuator 27 using a Piezo-effect element in the magneto-optical head apparatus 1B illustrated in FIG. 8 moves the collimator lens 21 only in the focusing direction, the first collimator lens actuator 27a moves the collimator lens 21 in the focusing direction in the same way as the collimator actuator 27 in the third embodiment, and the second collimator lens actuator 27b moves the collimator lens 21 in the track direction in the present embodiment.

The optical portion 17 is the same as that in the third embodiment explained with reference to FIG. 9.

While the collimator lens actuator driver 56 in the control apparatus 4A illustrated in FIG. 7 drives the electromagnetic first collimator lens actuator 23a and the tracking sub servo controller 45 drives the electromagnetic second collimator lens actuator 23b, the control apparatus 4C illustrated in FIG. 12 is different only in the point that the collimator lens actuator driver 56A drives the first collimator lens actuator 27a of a Piezo-effect element and the tracking sub servo controller 45A drives the second collimator lens actuator 27b of a Piezo-effect element.

The fourth embodiment establishes a more accurate optical system by controlling a position of the collimator lens 21 in the focusing direction and in the track direction in the same way as in the second embodiment.

FIFTH EMBODIMENT

A fifth embodiment of the optical head apparatus of the present invention and an optical recording/reproducing apparatus using the same will be explained with reference to FIG. 13.

Figure 13:
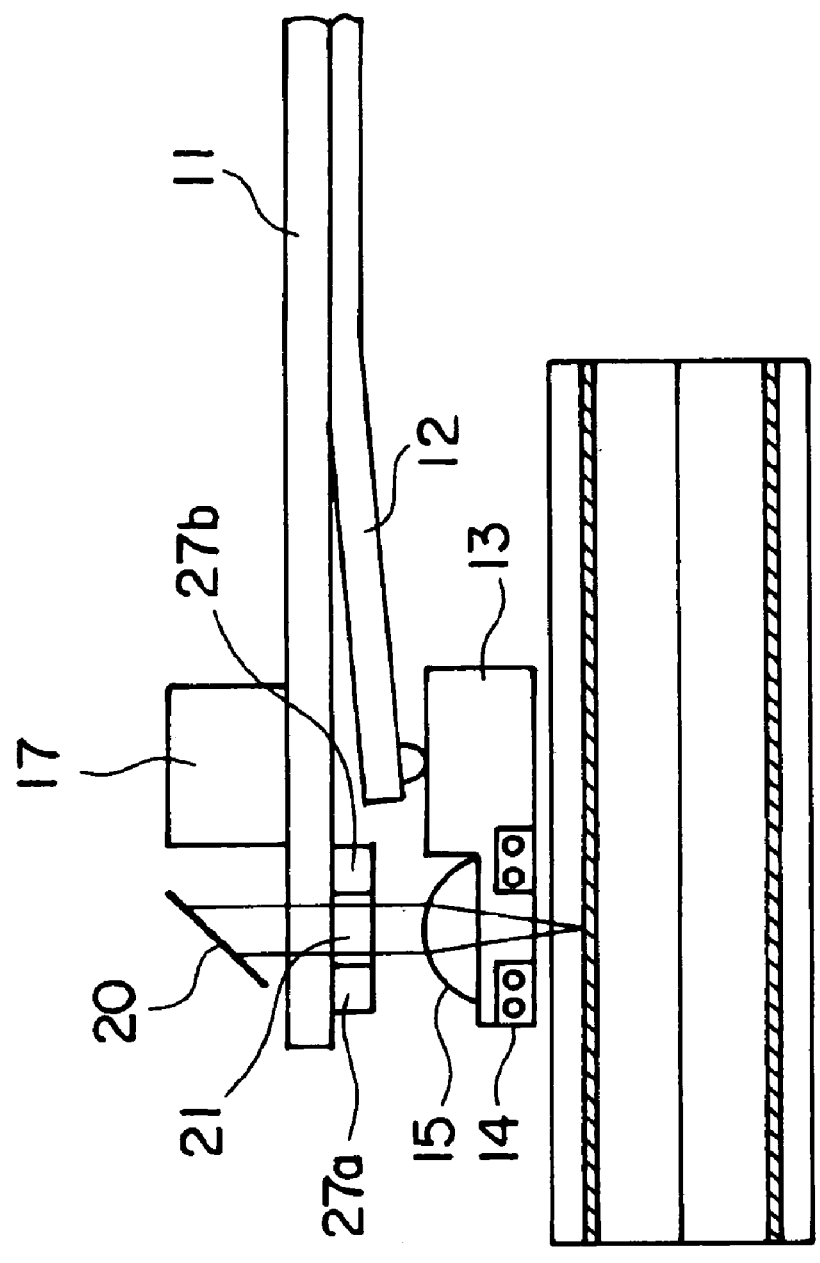
FIG. 13 is a sectional view of the configuration of a magneto-optical head apparatus as a fifth embodiment of an optical head apparatus of the present invention.

FIG. 13 is a sectional view of the configuration of the magneto-optical head apparatus as the fifth embodiment of the optical head apparatus of the present invention.

The magneto-optical head apparatus 1D of the fifth embodiment will be explained. Note that explanations on common parts with those in the first to third embodiments will be omitted except for key parts.

In the magneto-optical head apparatus 1D, the arm 11 is provided with an optical portion 17 in the horizontal direction, and the arm 11 is provided with a 45-degree inclined mirror 20 for deflecting a beam light emitted from the optical portion 17 to the collimator lens 21 positioned under the arm 11. The 45-degree inclined mirror 20 is a mirror fixed to be in a state of inclining by 45 degrees with respect to the horizontal surface of the arm 11.

The magneto-optical head apparatus 1D in the fifth embodiment also moves the collimator lens 21 in the focusing direction of the MO disk 3 and moves in the track direction of the MO disk 3 in the same way as in the magneto-optical head apparatus 1C in the fourth embodiment, so that it has two collimator lens actuators 27a and 27b composed of a Piezo-effect element in the same way as in the magneto-optical head apparatus 1C illustrated in FIG. 11.

The first collimator lens actuator 27a moves the collimator lens 21 in the focusing direction of the MO disk 3, and the second collimator lens actuator 27b moves the collimator lens 21 in the track direction of the MO disk 3.

The magneto-optical head apparatus 1D of the fifth embodiment is the same as the magneto-optical head apparatus 1C in the fourth embodiment except for the point of the direction of the optical portion 17 and the point being provided with the 45-degree inclined mirror 20.

A control apparatus for controlling by using the magneto-optical head apparatus 1D is substantially the same as the control apparatus 4C illustrated in FIG. 12.

The fifth embodiment exhibits the same effect as that in the fourth embodiment.

SIXTH EMBODIMENT

A sixth embodiment of the optical head apparatus of the present invention and an optical recording/reproducing apparatus using the same will be explained with reference to FIG. 14 and FIG. 15.

Figure 14:
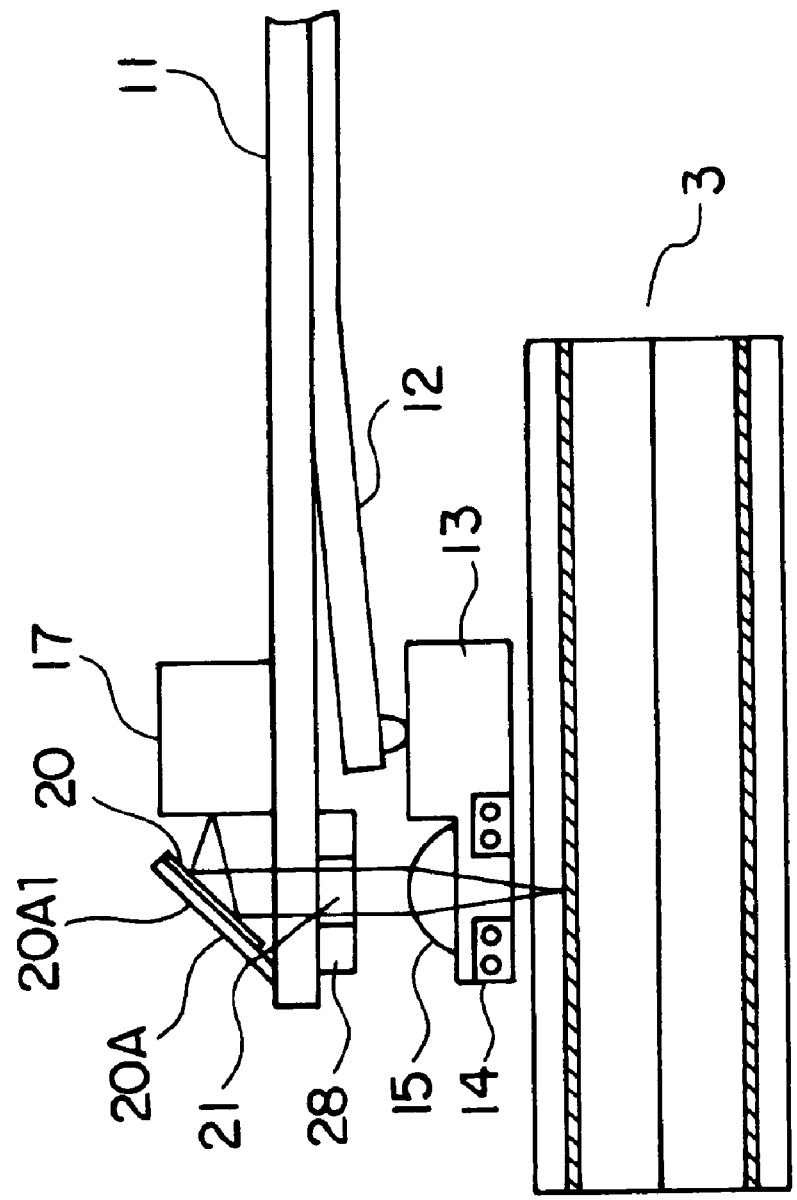
FIG. 14 is a sectional view of the configuration of a magneto-optical head apparatus as a sixth embodiment of an optical head apparatus of the present invention.

FIG. 14 is a sectional view of the configuration of a magneto-optical head apparatus as the sixth embodiment of the optical head apparatus of the present invention.

Figure 15:
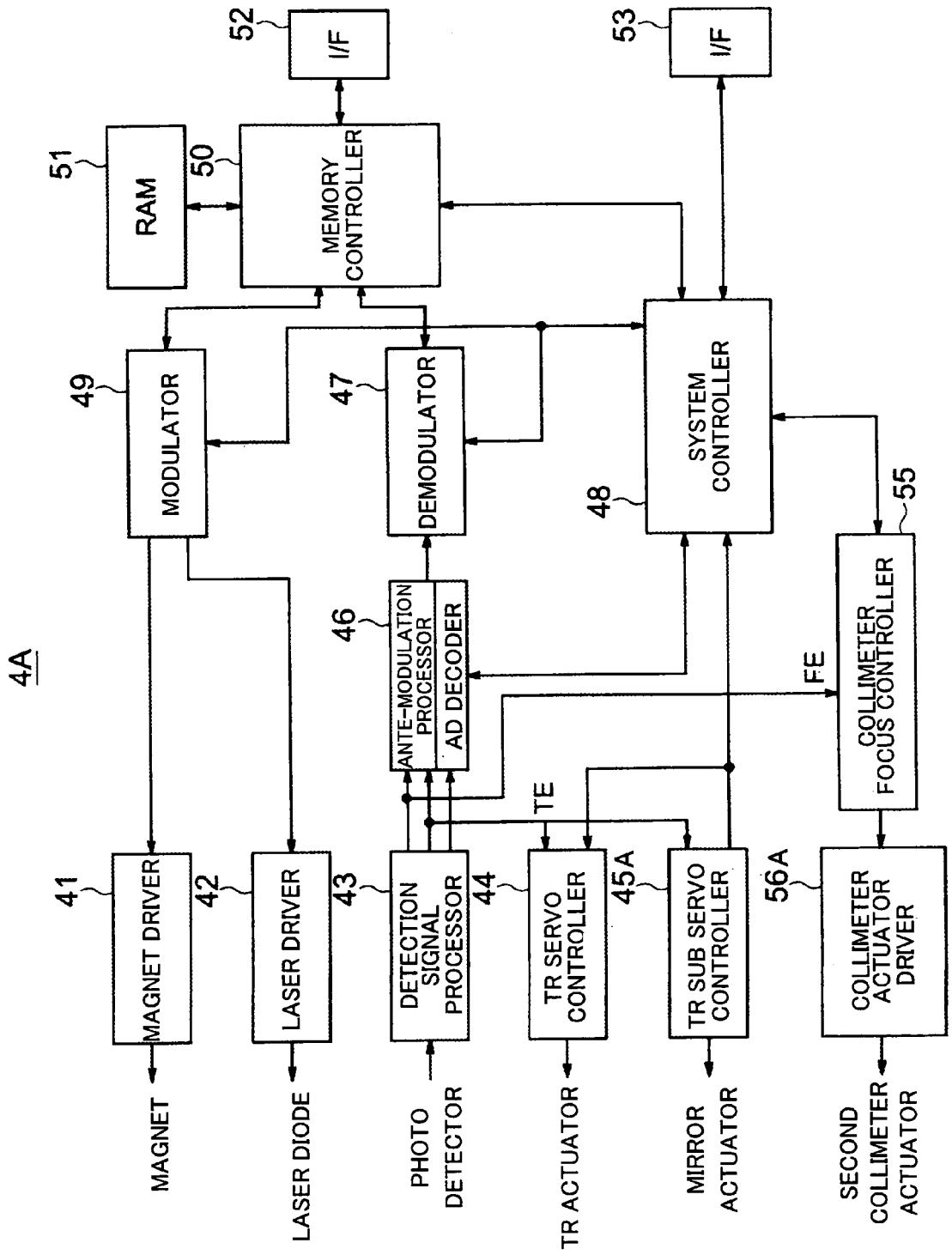
FIG. 15 is a view of the configuration of a control apparatus of a sixth embodiment of an optical recording/reproducing apparatus of the present invention.

FIG. 15 is a view of the configuration of a control apparatus using the magneto-optical head apparatus of the sixth embodiment illustrated in FIG. 14.

The magneto-optical head apparatus 1E of the sixth embodiment will be explained. Note that explanations on common parts with those in the first to fifth embodiments will be omitted except for key parts.

In the magneto-optical head apparatus 1E, the arm 11 is provided with an optical portion 17 in the horizontal direction, and the arm 11 is provided with an actuator attached 45-degree inclined mirror 20A for deflecting a beam light emitted from the optical portion 17 to the collimator lens 21 positioned under the arm 11.

The actuator attached 45-degree inclined mirror 20A is a mirror 20 provided in a state of inclining by 45 degrees with respect to the horizontal surface of the arm 11 basically in the same way as the 45-degree inclined mirror 20 illustrated in FIG. 13. It is a mirror having an actuator for rotating the mirror about an axis 20a1 for directing the beam light emitted from the light source of the optical portion 17 to be able to sweep along the track direction of the MO disk 3 on both sides of the optical axis about the axis passing through the collimator lens.

As the actuator of the actuator attached 45-degree inclined mirror 20A, an electromagnet or a Piezo-effect element is used and fixed to the arm 11. In terms of making the magneto-optical apparatus 1E lighter and more compact, a Piezo-effect element is preferably used.

The collimator lens 21 and the collimator lens actuator 28 are provided under the arm 11.

The collimator actuator 28 is an actuator for moving the collimator lens 21 vertically along the optical axis, that is, along the focusing direction of the MO disk 3.

The collimator actuator 28 may be either of an electromagnetic actuator as same as the collimator actuator 23 in the first embodiment or an actuator using a Piezo-effect element as same as the collimator actuator 27 in the third embodiment.

As the collimator actuator 28, when the same type as the actuator of the actuator added 45-degree inclined mirror 20A is used, the control method and the drive method of the actuators can be made the same, so that it is preferable to select the same type for the collimator actuator 28 and the actuator of the actuator added 45-degree inclined mirror 20A. As these actuators, Piezo-effect element is preferably used in terms of making it compact.

In the same way as the magneto-optical head apparatuses 1C and 1D in the fourth and fifth embodiments, the magneto-optical head apparatus 1D of the sixth embodiment is also capable of moving the beam light entering to the collimator lens 21 to the track direction by moving the collimator lens 21 in the focusing direction and rotating the mirror of the actuator attached 45-degree inclined mirror 20A.

The configuration of the control apparatus 4E for controlling by using the magneto-optical head apparatus 1D of the sixth embodiment illustrated in FIG. 15 is similar to the control apparatus 4 illustrated in FIG. 7, but the tracking sub servo controller 45 drives the actuator of the actuator attached 45-degree inclined mirror 20A, for example, an actuator using a Piezo-effect element, and the collimator lens actuator driver 56 drives the collimator lens actuator 28, for example, the actuator 28 using a Piezo-effect element.

The sixth embodiment exhibits the same effect as that in the fourth and fifth embodiments.

SEVENTH EMBODIMENT

A seventh embodiment of the optical head apparatus of the present invention and an optical recording/reproducing apparatus using the same will be explained with reference to FIG. 16.

Figure 16:
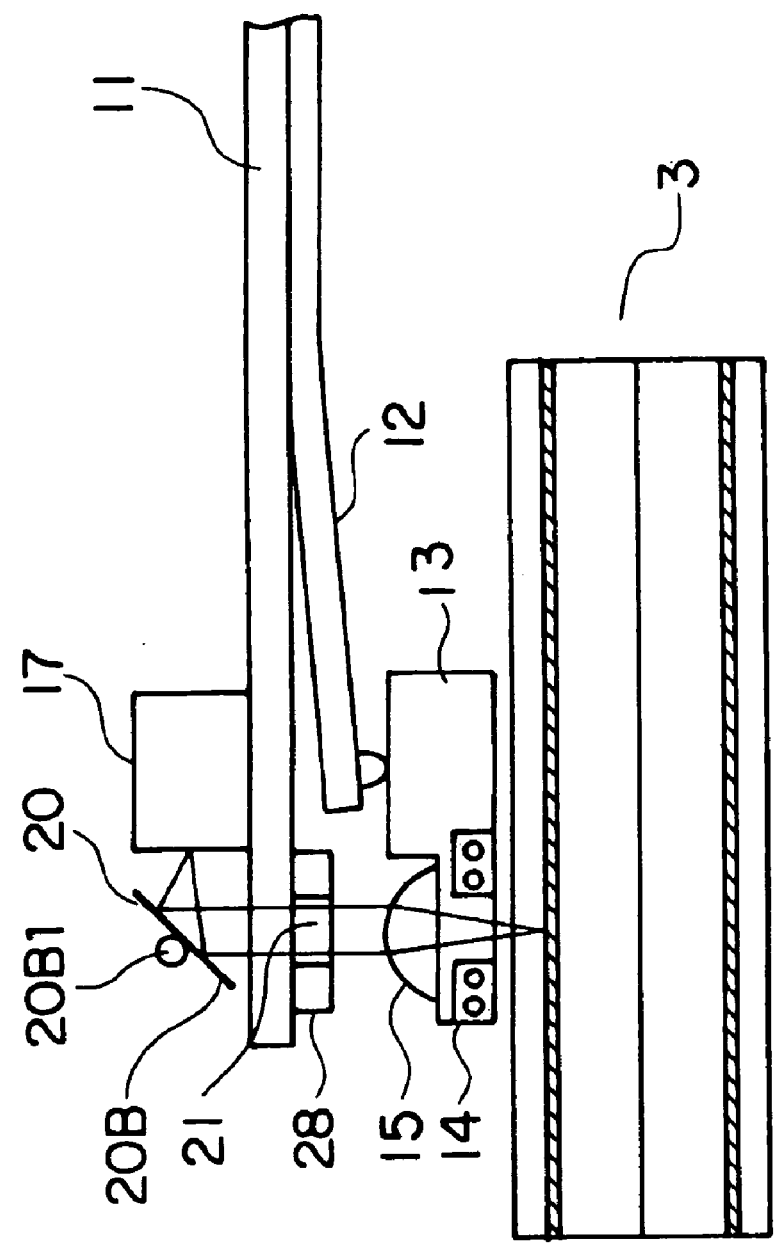
FIG. 16 is a sectional view of the configuration of a magneto-optical head apparatus as a seventh embodiment of an optical head apparatus of the present invention.

FIG. 16 is a sectional view of the configuration of a magneto-optical head apparatus as the seventh embodiment of the optical head apparatus of the present invention.

The magneto-optical head apparatus 1F of the seventh embodiment will be explained. Note that explanations on common parts with those in the first to fifth embodiments will be omitted except for key parts.

In the magneto-optical head apparatus 1F, as same as in FIG. 14, the arm 11 is provided with an optical portion 17 in the horizontal direction, and the arm 11 is provided with an actuator attached 45-degree inclined mirror 20B for deflecting a beam light emitted from the optical portion 17 to the collimator lens 21 positioned under the arm 11.

The actuator attached 45-degree inclined mirror 20B is a mirror 20 provided in a state of inclining by 45 degrees with respect to the horizontal surface of the arm 11 basically in the same way as the 45-degree inclined mirror 20 illustrated in FIG. 13 and FIG. 14. However, being different from the actuator attached 45-degree inclined mirror 20A illustrated in FIG. 14, the actuator attached 45-degree inclined mirror 20B of the present embodiment is a mirror having an actuator for rotating the mirror about an axis 20B1 provided to be perpendicular to the paper surface for directing the beam light emitted from the light source of the optical portion 17 to be able to sweep in the direction of traversing the track direction of the MO disk 3 on both sides of the optical axis about the axis passing through the collimator lens 21.

As the actuator of the actuator attached 45-degree inclined mirror 20B, as same as the actuator attached 45-degree inclined mirror 20A, an electromagnet or a Piezo-effect element is used and fixed to the arm 11. In terms of making the magneto-optical head apparatus 1E lighter and more compact, a Piezo-effect element is preferably used.

The collimator lens 21 and the collimator lens actuator 28 are provided under the arm 11 in the same way as in the sixth embodiment explained with reference to FIG. 14. The collimator lens actuator 28 is an actuator for moving the collimator lens 21 vertically along the optical axis, that is, along the focusing direction of the MO disk 3.

The collimator actuator 28 may be either of an electromagnetic actuator as same as the collimator actuator 23 in the sixth embodiment or an actuator using a Piezo-effect element as same as the collimator actuator 27 in the third embodiment.

As the collimator actuator 28, when using the same type as the actuator of the actuator added 45-degree inclined mirror 20A, the same control method and drive method can be applied to the actuators, so that it is preferable to select the same type for the collimator actuator 28 and the actuator of the actuator added 45-degree inclined mirror 20B. As these actuators, Piezo-effect element is preferably used in terms of making it compact.

In the same way as the magneto-optical head apparatus IC and ID in the fourth and fifth embodiments, the magneto-optical head apparatus 1F in the seventh embodiment is also capable of moving the collimator lens 21 in the focusing direction and moving the beam light emitted to the collimator lens 21 to the traversing direction of the track direction by rotating the mirror of the actuator added 45-degree inclined mirror 20B.

While not illustrated, the configuration of the control apparatus for controlling by using the magneto-optical head apparatus 1F of the seventh embodiment illustrated in FIG. 16 is the same as the control apparatus 4E illustrated in FIG. 15, and the tracking sub servo controller 45 drives the actuator of the actuator attached 45-degree inclined mirror 20B, for example, an actuator using a Piezo-effect element, and the collimator lens actuator driver 56 drives the collimator lens actuator 28, for example, the actuator 28 using a Piezo-effect element.

The seventh embodiment exhibits the same effect as that in the fourth and fifth embodiments.

In the above embodiments, the floating distance "d" of the object lens 15 from the magneto-optical (MO) disk 3 mounted on the slider 13, more accurately, the floating distance "d" from the surface of the MO disk 3 to the second converging lens 15b is not limited to the values shown as an example in Table 1. It may be, for example, a value shown in Table 2.

TABLE 2

| Floating Distance "d" | |
|---|---|
| The case of near field range (NFR): | 20 nm to 60 nm |
| The case with high NA (0.85 to 0.95): | 0.1 μm to 0.4 μm |

The optical head apparatus of the present invention is compact and light, so that it can be applied to an optical head apparatus used for a near field recording operation or a far field recording operation.

EIGHTH EMBODIMENT

An eighth embodiment of the present invention will be explained with reference to FIG. 17.

FIG. 17 is a partial perspective view of a magneto-optical recording/reproducing apparatus wherein a plurality of magneto-optical disks are stacked to be multilayer along the rotation axis and writing and reading of data to the plurality of magneto-optical disks are performed at a time.

The magneto-optical head in the above embodiments is used for one magneto-optical disk. The above magneto-optical head is compact and light, so that even when using a plurality of magneto-optical heads for data writing and reading of the multilayered plurality of magneto-optical disks illustrated in FIG. 17, the configuration of the overall magneto-optical recording/reproducing apparatus can be made compact. As a result, a magneto-optical recording/reproducing apparatus as such can be produced to be light at a low cost and can be applied to a variety of purposes.

NINTH EMBODIMENT

A ninth embodiment of the present invention will be explained with reference to FIG. 18A and FIG. 18B.

Figure 18A:
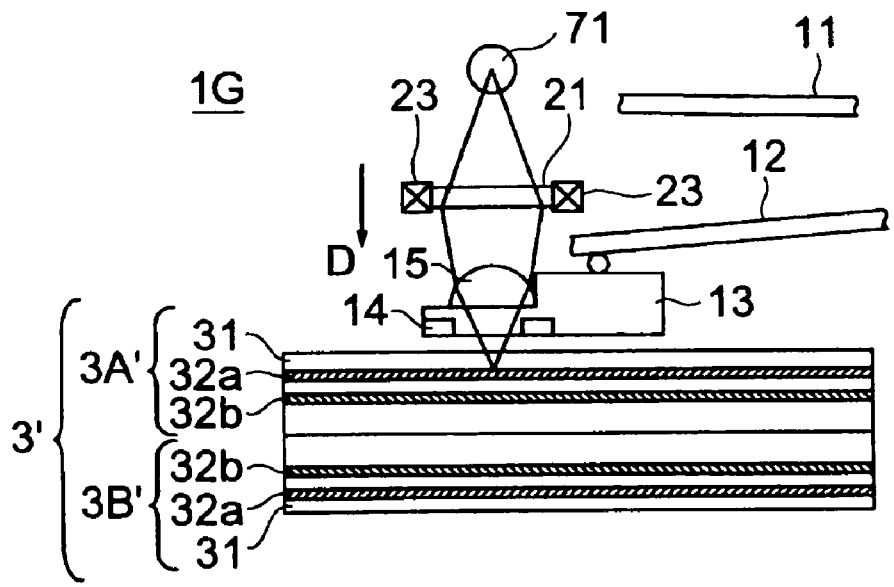
FIG. 18A and FIG. 18B are views showing a section of an optical head apparatus used in the case of writing data to each recording surface of two-layer recording surfaces or reading data from each recording surface of two-layer recording surfaces of an MO disk obtained by putting together two recording media each having two-layer recording surfaces as a ninth embodiment of the present invention.
Figure 18B:
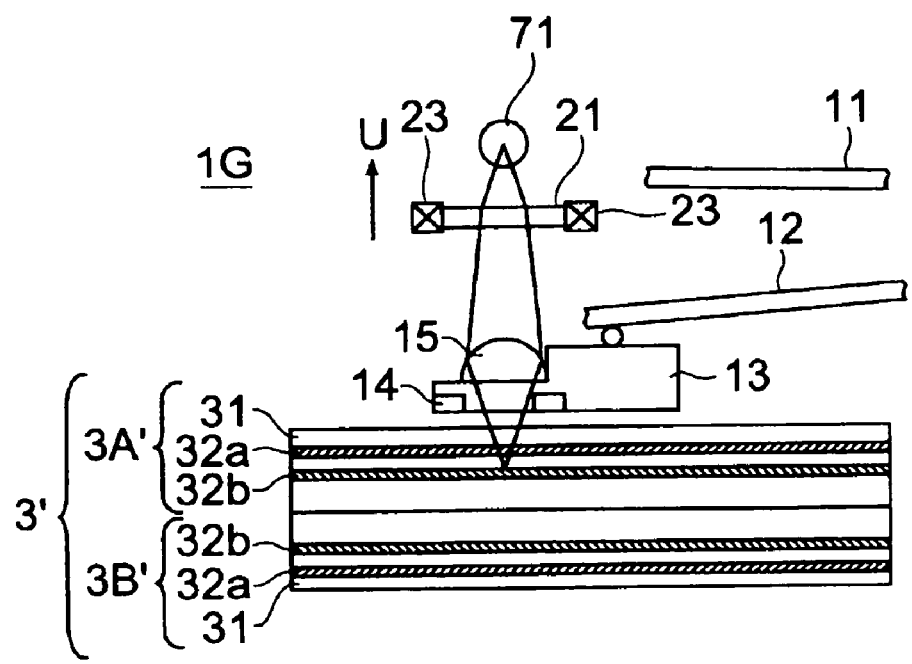
Figure 19:
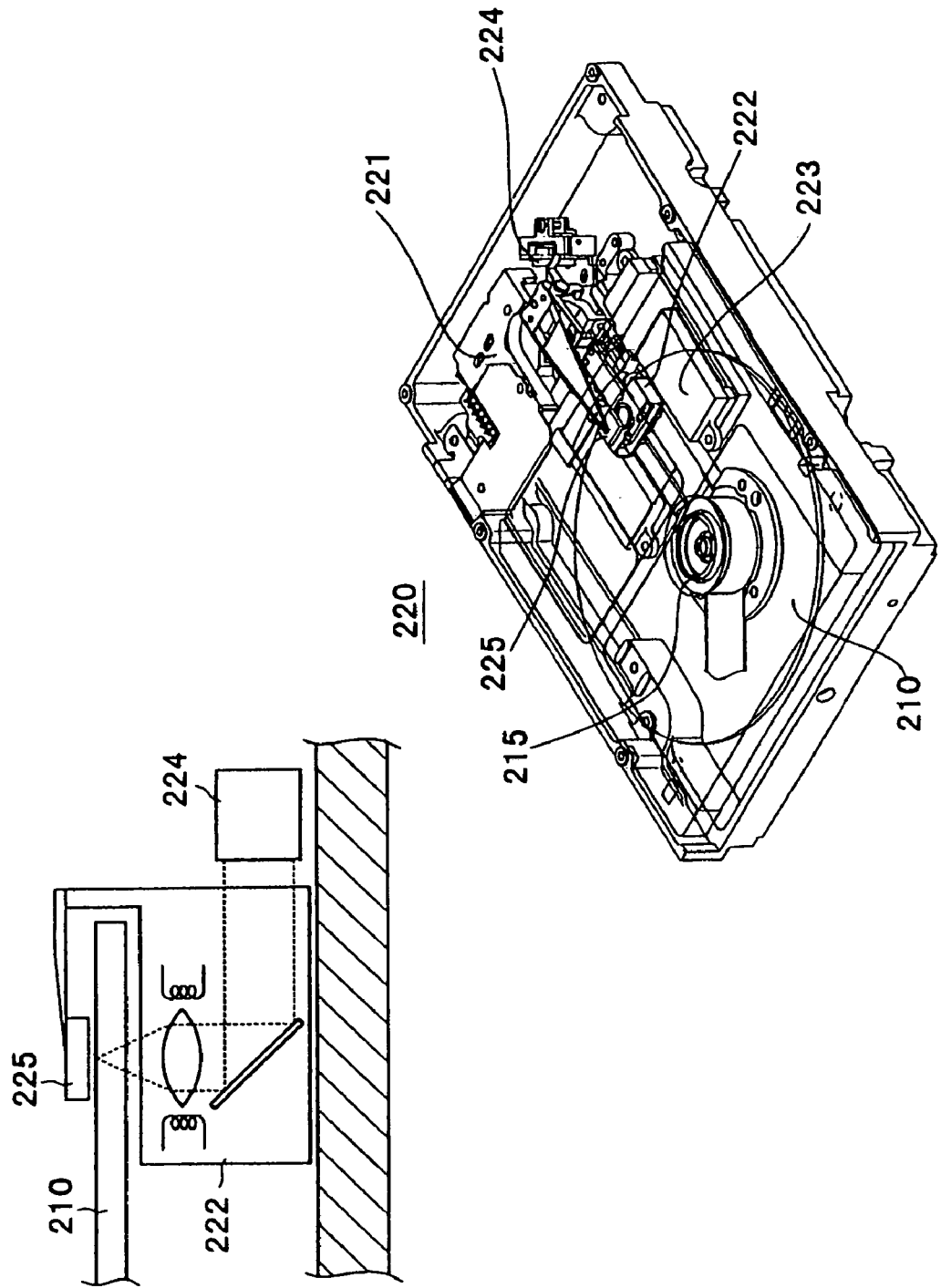
FIG. 19 is a view of the configuration of a magneto-optical recording/reproducing apparatus as a first prior art.
Figure 20:
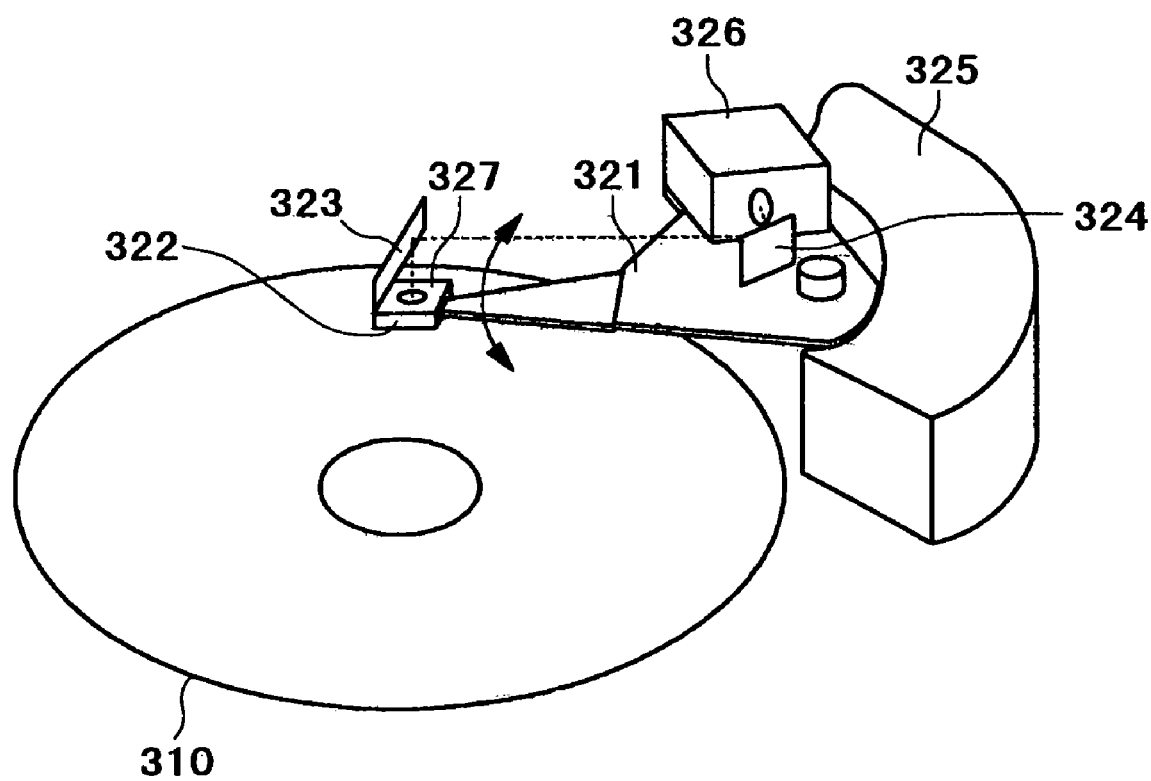
FIG. 20 is a view of the configuration of a magneto-optical head as a second prior art.

FIG. 18A and FIG. 18B are sectional views of an optical head apparatus 1G used when writing data respectively to recording surfaces of the two-layer recording surfaces or reading data respectively from recording surfaces of two-layer recording surfaces of an MO disk 3' obtained by putting together two recording media 3A' and 3B' each having two layers of recording surfaces 32a and 32b as the ninth embodiment of the present invention.

FIG. 18A is a view showing a position of the collimator lens 21 when writing data to the recording surface 32a of the first layer or reading data from the recording surface 32a of the first layer.

FIG. 18B is a view showing a position of the collimator lens 21 when writing data to the recording surface 32b of the second layer or reading data from the recording surface 32b of the second layer.

The optical head apparatus 1G has the same configuration as that of the optical head apparatus in the first embodiment illustrated in FIG. 3. Namely, in the optical head apparatus 1G, the magnetic modulation coil 14 and the object lens 15 are mounted on the slider 13 and the collimator lens 21 is positioned above the object lens 15. The position of the collimator lens 21 moves vertically by the collimator lens actuator 23. A light from the light source 71 of the hybrid optical apparatus 7 can be brought to pass through the object lens 15 and converged on the recording surface 32a of the first layer or the recording surface 32b of the second layer in accordance with the position of the collimator lens 21.

Therefore, for example, when an instruction that which of the recording surface 32a of the first layer or the recording surface 32b of the second layer should be used is given from the above apparatus (not shown) to the system controller 48 of the control apparatus 4 illustrated in FIG. 5 via the interface circuit 53, in accordance with the instruction, the system controller 48 gives an instruction of which recording layer should be focused to the collimator lens position controller 55.

When writing data to the recording surface 32a of the first layer or reading data from the recording surface 32a of the first layer, as illustrated in FIG. 18A, the collimator lens position controller 55 drives the collimator lens actuator 23 via the collimator lens actuator driver 56 to move the collimator lens 21 to the MO disk 3' side for focus control.

When writing data to the recording surface 32b of the second layer or reading data from the recording surface 32b of the second layer, as illustrated in FIG. 18B, the collimator lens position controller 55 drives the collimator lens actuator 23 via the collimator lens actuator driver 56 to move the collimator lens 21 to the opposite side of the MO disk 3', that is, to the fixed arm 11 side for focus control.

As explained above, according to the ninth embodiment of the present invention, even when there are two recording layers, data writing or data reading to and from any recording layer of the two layers can be performed by the above optical head apparatus 1G explained above.

The optical head apparatus 1G in the ninth embodiment is not limited to the case having the same configuration as that of the optical head apparatus in the first embodiment explained above, and may be an optical head apparatus in any of the above first to eighth embodiments. In FIG. 18A and FIG. 18B, the light source 71 of the hybrid optical apparatus 7 is schematically illustrated and a position of the light source may be any of those in the above embodiments.

Other Modifications

In the above embodiments, the case of using the MO disk 3 as an optical rotary recording medium was explained as an example, but application of the present invention is not limited to an MO disk and may be applied to a variety of optical rotary recording media, such as an optical disk without a magnetic effect and a CD. When reading data from an optical disk, it is not necessary to mount the magnetic modulation coil 14 or other magnetic field application means on the slider 13.

The optical head apparatus, control apparatus optical recording/reproducing apparatus obtained by combining the two of the present invention are not limited to the above embodiment and modifications, and may be furthermore variously embodied by applying technical thoughts of the above flying head type optical head apparatus.

According to the present invention, optical conditions can be improved by providing a collimator lens between the light source and the object lens of the flying head type optical head apparatus and adjusting its position.

Particularly, the optical head apparatus of the present invention is compact and light, so that it can be suitably applied to a compact optical recording/reproducing apparatus.

The optical recording/reproducing apparatus of the present invention using the above optical head apparatus is capable of performing accurate focus control and/or tracking control and exhibits a high speed response and high reliability.

INDUSTRIAL APPLICABILITY

The optical recording/reproducing apparatus of the present invention can be used for recording/reproducing data in various fields.

EXPLANATION OF REFERENCES 1, 1A to 1F magneto-optical head apparatus
3 magneto-optical (MO) disk
4 control apparatus
    41 magnet driver
    42 laser driver
    43 detection signal processor
    44 tracking servo controller
    55 collimator lens position controller
    56 collimator lens actuator driver
7 hybrid optical portion
11 arm
12 suspension.
13 slider
14 magnetic modulation coil
15 object lens
17 optical portion
19 voice coil motor (VCM)
20, 20A 45-degree inclined mirror
21 collimator lens
23 collimator lens actuator
27, 28 collimator lens actuator

The invention claimed is:

1. A flying head type optical head apparatus, comprising:
a fixed arm;
a suspension, an end of which is fixed to said fixed arm and the other end is a free end;
a slider attached to the free end of said suspension;
an object lens mounted on said slider;
an optical means fixed to said fixed arm and having a light source and a light receiving system with the fixed arm disposed between said object lens and said optical means;
a collimator lens positioned between said fixed arm and said object lens along an optical axis connecting said light source and said object lens via said collimator lens, for converging a light from said light source to make it enter said object lens, converging a returned-back light from said object lens to make it enter said light source; and
a first collimator lens moving means for moving said collimator lens along said optical axis between said fixed arm and said object lens;
wherein the slider mounted with said object lens, attached to the free end of said suspension floats due to a wind pressure of a rotary body rotating at a position facing to said object lens.

2. An optical head apparatus as set forth in claim 1, wherein said collimator lens is positioned so that a focal position thereof positions approximately at a light emission point of said light source, and an incident iris of said object lens positions at a focal position when assuming that a parallel light enters from the light source to said collimator lens.

3. An optical head apparatus as set forth in claim 2, wherein a distance between said collimator lens and the light emission point of said light source is approximately equal to a distance between said collimator lens and the incident iris of said object lens.

4. An optical head apparatus as set forth in claim 1, wherein said first collimator lens moving means is an electromagnet.

5. An optical head apparatus as set forth in claim 1, wherein said first collimator lens moving means is a Piezo-effect element.

6. An optical head apparatus as set forth in claim 1, wherein said rotary body is a rotary optical recording medium.

7. An optical head apparatus as set forth in claim 1, further comprises a second collimator lens moving means for substantially moving said collimator lens in the direction perpendicular to said optical axis.

8. An optical head apparatus as set forth in claim 7, wherein said second collimator lens moving means is an electromagnet.

9. An optical head apparatus as set forth in claim 7, wherein said second collimator lens moving means is a Piezo-effect element.

10. An optical head apparatus as set forth in claim 7, wherein said rotary body is a rotary magneto-optical recording medium.

11. An optical head apparatus as set forth in claim 1, wherein
said optical means fixed to said fixed arm emits a light from said light source along a surface of said arm; and
said fixed arm is provided with a mirror for directing the light emitted from said optical means to said collimator lens.

12. An optical head apparatus as set forth in claim 11, wherein
said optical means fixed to said fixed arm emits a light from said light source along a surface of said fixed arm; and
said fixed arm has a mirror for directing the light emitted from said optical means to said collimator lens and a mirror rotation means for rotating the mirror for making the light emitted from said optical means enter said collimator lens by being shifted from said optical axis.

13. An optical head apparatus as set forth in claim 12, wherein said mirror rotation means is an electromagnet.

14. An optical head apparatus as set forth in claim 12, wherein said mirror rotation means is a Piezo-effect element.

15. An optical head apparatus as set forth in claim 1, wherein said object lens is configured by combining two converging lenses provided close to the slider and used for a near field recording operation.

16. An optical recording/reproducing apparatus, comprising:
a rotary driving means for a rotary recording medium for optically or magneto-optically recording and/or recording/reading data;
a flying head type optical head apparatus comprising a fixed arm; a suspension, an end of which is fixed to said fixed arm and the other end is a free end; a slider attached to the free end of said suspension; an object lens mounted on said slider; an optical means fixed to said fixed arm and having a light source and a light receiving system with the fixed arm disposed between said object lens and said optical means; a collimator lens positioned between said fixed arm and said object lens along an optical axis connecting said light source and said object lens via said collimator lens, for converging a light from said light source to make it enter said object lens; and a first collimator lens moving means for moving said collimator lens along said optical axis between said fixed arm and said object lens; wherein the slider mounted with said object lens, attached to the free end of said suspension floats due to a wind pressure caused by rotation of said rotary recording medium rotating at a position facing to said object lens; and
a control apparatus for performing tracking control on said optical head apparatus, comprising a collimator lens position control means for controlling a position of said collimator lens by driving said first collimator lens moving means based on a focus error signal.

17. An optical recording/reproducing apparatus as set forth in claim 16, wherein said collimator lens is positioned so that a focal position thereof positions approximately at a light emission point of said light source, and an incident iris of said object lens positions at a focal position when assuming that a parallel light enters from the light source to said collimator lens.

18. An optical recording/reproducing apparatus as set forth in claim 17, wherein a distance between said collimator lens and the light emission point of said light source is approximately equal to a distance between said collimator lens and the incident iris of said object lens.

19. An optical recording/reproducing apparatus as set forth in claim 16, wherein
said optical head apparatus further comprises a second collimator lens moving means for substantially moving said collimator lens in the direction perpendicular to said optical axis; and
said control apparatus further comprises a tracking sub servo control means for controlling a position of said collimator lens to the track direction of said rotary recording medium by driving said second collimator lens moving means based on a tracking error signal.

20. An optical recording/reproducing apparatus as set forth in claim 16, wherein
said rotary recording medium has one or a plurality of recording surfaces; and
said collimator lens position control means of said control means drives said first collimator lens moving means to adjust a position of said collimator lens so that a light from said light source is focused on one recording surface subjected to recording or reproducing of data through said object lens among one or a plurality of recording surfaces of said rotary recording medium.

21. An optical head apparatus as set forth in claim 1, wherein the first collimator lens moving means moves the collimator lens independently to the light source.

22. An optical head apparatus as set forth in claim 16, wherein the first collimator lens moving means moves the collimator lens independently to the light source.

* * * * *